(12) United States Patent
Burmesch et al.

(10) Patent No.: US 6,755,054 B2
(45) Date of Patent: Jun. 29, 2004

(54) CABLE LOCKING MECHANISM

(75) Inventors: Gary Burmesch, Port Washington, WI (US); Christopher Rohde, West Allis, WI (US); Suzanne Schneider, Franklin, WI (US); Kenneth N. Grandy, South Milwaukee, WI (US); Glenn Meekma, Menomonee Falls, WI (US)

(73) Assignee: Master Lock Company, Milwaukee, WI (US)

( * ) Notice: Subject to any disclaimer, the term of this patent is extended or adjusted under 35 U.S.C. 154(b) by 0 days.

(21) Appl. No.: 10/234,688

(22) Filed: Sep. 3, 2002

(65) Prior Publication Data

US 2003/0046852 A1 Mar. 13, 2003

Related U.S. Application Data

(60) Provisional application No. 60/316,577, filed on Aug. 31, 2001, and provisional application No. 60/332,753, filed on Nov. 14, 2001.

(51) Int. Cl.[7] .............................................. E05B 67/06
(52) U.S. Cl. ............................ 70/49; 70/417; 42/70.11
(58) Field of Search ............................... 70/49, 14, 18, 70/19; 42/70.11; 24/134 R, 132 R

(56) References Cited

U.S. PATENT DOCUMENTS

| | | | | |
|---|---|---|---|---|
| 1,348,666 A | | 8/1920 | Schuler | |
| 2,190,661 A | * | 2/1940 | Hauer | 70/49 |
| 3,435,642 A | * | 4/1969 | Del Pesco | 70/49 |
| 3,821,884 A | * | 7/1974 | Walsh | 70/417 X |
| 4,180,996 A | * | 1/1980 | Lebrecht | 70/417 X |
| 4,398,366 A | * | 8/1983 | Wernicki | 42/70.11 |
| 4,479,320 A | * | 10/1984 | Fix | 42/70.11 |
| 4,512,099 A | * | 4/1985 | Mathew | 42/70.11 |
| 4,639,978 A | * | 2/1987 | Boden | 24/134 R |
| 4,878,270 A | * | 11/1989 | Westerkamp | 24/132 R |
| 4,999,940 A | * | 3/1991 | Madden | 42/70.11 |
| 5,289,653 A | * | 3/1994 | Szebeni et al. | 42/70.11 |
| 5,475,994 A | * | 12/1995 | Briley et al. | 42/70.11 X |
| 5,491,918 A | * | 2/1996 | Elmstedt | 42/70.11 |
| 5,517,835 A | | 5/1996 | Smith | |
| 5,664,358 A | * | 9/1997 | Haber et al. | 42/70.11 |
| 5,732,498 A | * | 3/1998 | Arreguin | 42/70.11 |
| 5,791,170 A | * | 8/1998 | Officer | 70/49 |
| 5,987,946 A | * | 11/1999 | Watts | 70/417 X |
| 6,212,919 B1 | | 4/2001 | Gerow | |
| 6,311,422 B1 | * | 11/2001 | Exum et al. | 42/70.11 |
| 6,382,002 B1 | * | 5/2002 | Chen | 42/70.11 |
| 6,393,750 B1 | * | 5/2002 | Rossini et al. | 42/70.11 |
| 6,543,171 B2 | * | 4/2003 | Kellerman | 42/70.11 |
| 6,560,910 B1 | * | 5/2003 | McLaren | 42/70.11 |

FOREIGN PATENT DOCUMENTS

| | | |
|---|---|---|
| GB | 178900 A | 4/1922 |
| WO | WO 02 20926 A | 3/2002 |

\* cited by examiner

*Primary Examiner*—Suzanne Dino Barrett
(74) *Attorney, Agent, or Firm*—Calfee, Halter & Griswold, LLP

(57) ABSTRACT

A cable locking mechanism for use in a variety of cable locks that includes one or more locking clamps, a lever arm, a spring that biases the locking clamps, and an actuation means that engages the lever arm. When a cable is inserted into a cable passageway of a cable lock, the locking clamps secure the cable and prevent it withdrawal from the lock body. To remove the cable, the actuation means is deployed to move the lever arm, which engages and displaces the locking clamps along a sloped surface. The displacement of the locking clamps widens the cable passageway, thereby allowing the cable to move freely in and out of the lock body.

18 Claims, 16 Drawing Sheets

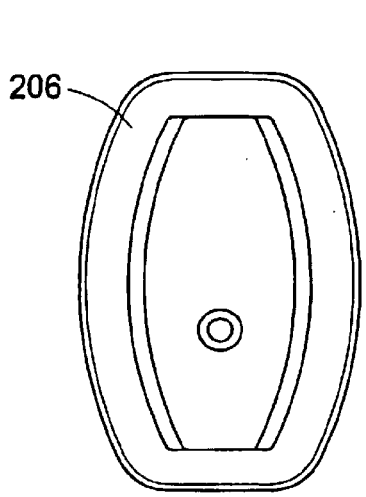
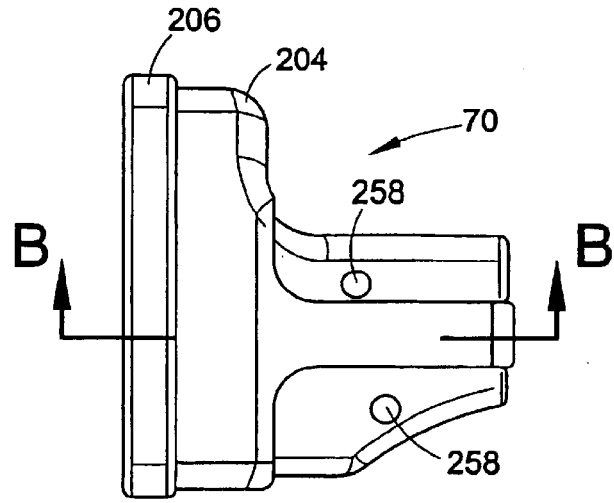
FIG. 3   FIG. 2A
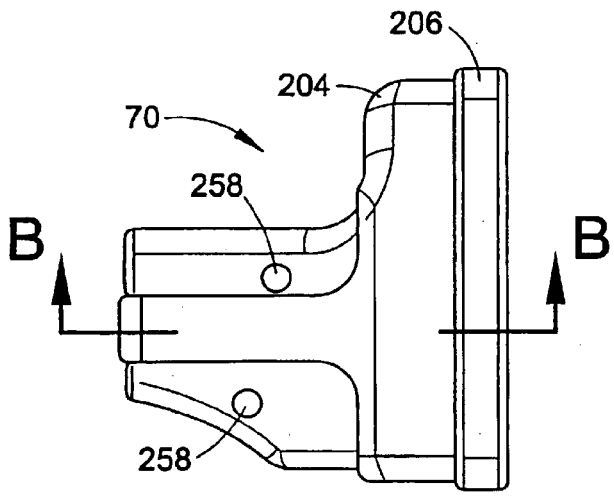
FIG. 2B
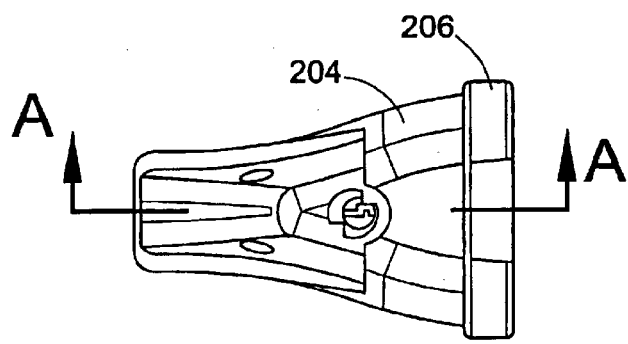
FIG. 4

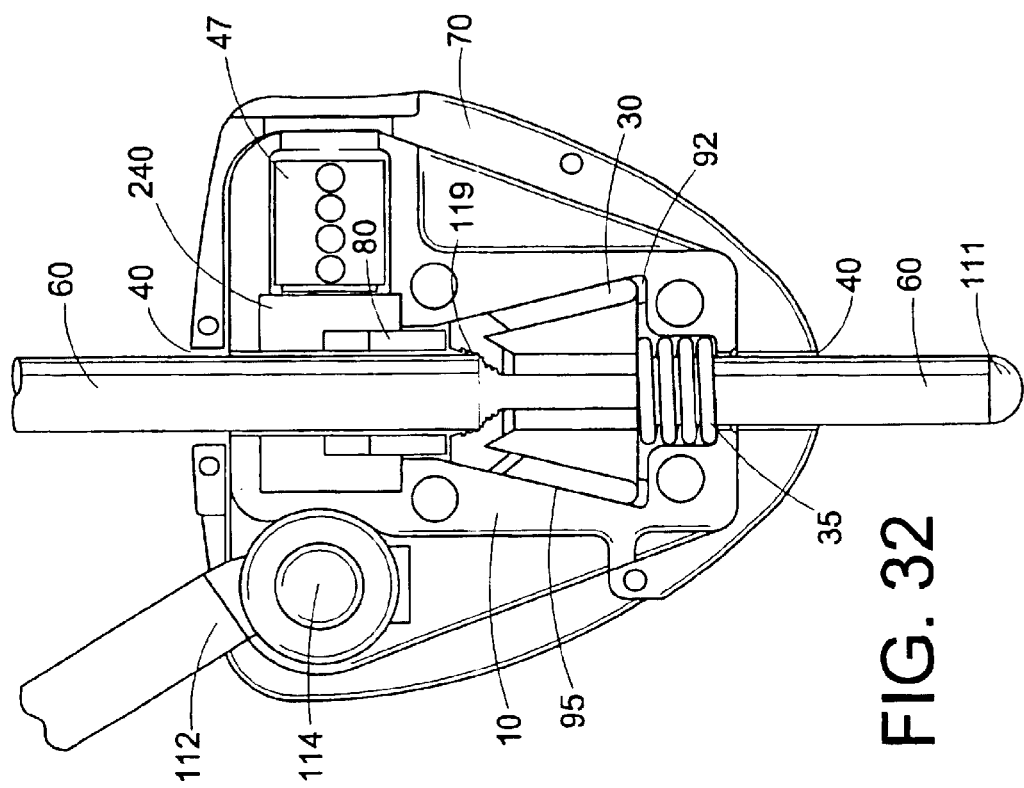
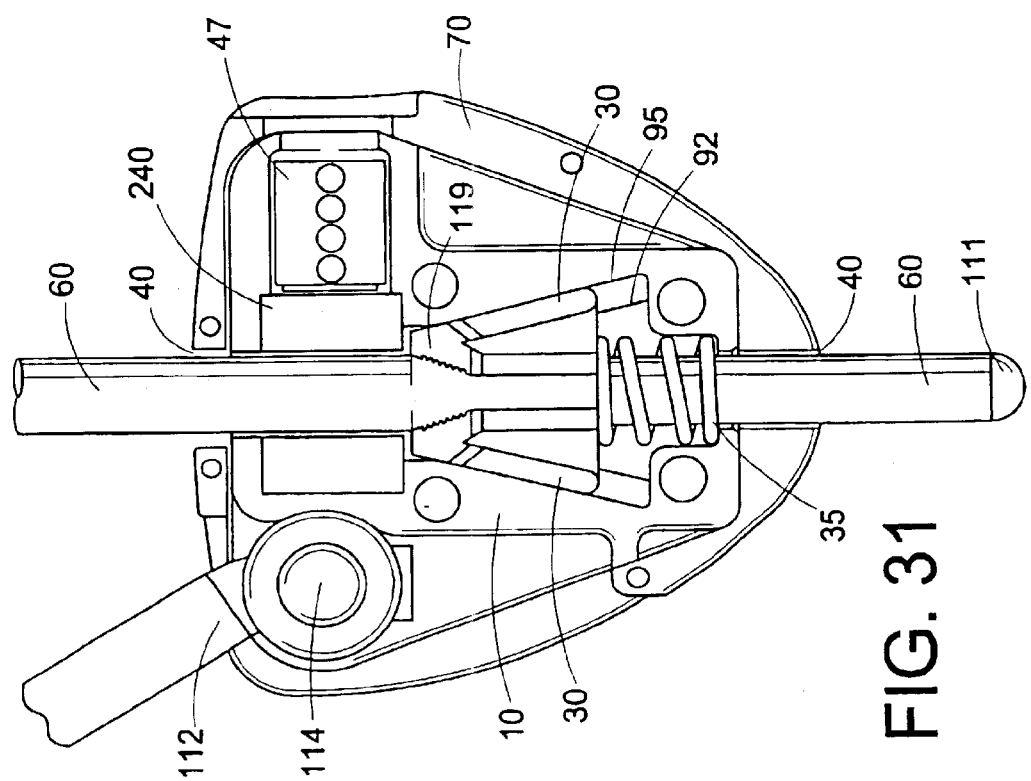

CABLE LOCKING MECHANISM

CROSS-REFERENCE TO RELATED APPLICATIONS

This application claims priority to U.S. patent application Ser. No. 09/655,625, filed Sep. 5, 2000; U.S. Provisional Patent Application Serial No. 60/316,577, filed Aug. 31, 2001; and U.S. Provisional Patent Application Serial No. 60/332,753, filed Nov. 14, 2001.

FIELD OF INVENTION

The present invention relates to a locking mechanism and more specifically to a locking mechanism used for securing a cable.

BACKGROUND

Locks are necessary to provide security to a variety of items. However, traditional padlocks or other lock constructions are not always applicable to all objects. As such, cables have been used due to their flexibility and adjustable length. Typically, cables are clamped in a manner that crimps the cable, thereby compromising the integrity of the lock. In addition a crimped cable does not readily slide in and out of a lock body, and therefore makes the cable lock difficult to use.

It is therefore desirable to produce a locking mechanism for a cable lock that provides for secure locking of objects without damaging the cable. Such a cable lock would have a wide variety of applications due to its versatility and longevity. It is also desirable to produce such a cable locking mechanism in an economic manner.

SUMMARY OF THE INVENTION

The present invention is a mechanism for locking a cable and can be implemented in a number of cable lock designs. The cable locking mechanism includes one or more locking clamps, a lever arm, a spring that biases the locking clamps, and an actuation means that engages the lever arm. In one embodiment, the locking clamps are housed within an opening in the lock body, and the opening has one or more sloped surfaces. The locking clamps have a complementary sloped surface that slides along the sloped surface of the opening when the locking clamps are displaced. The lever arm, which is moved by actuation of the actuation means, engages the locking clamps in two different positions. The first position is the locked position, wherein the clamps are fully biased by the spring to create a narrow cable passageway. The second position is the unlocked position, wherein the lever arm engages the locking clamps to displace them against the spring force to widen the cable passageway. In one embodiment, the engagement of the locking members is by a protrusion located on one side of the lever arm.

BRIEF DESCRIPTION OF THE FIGURES

In the accompanying figures, which are incorporated in and constitute a part of the specification, embodiments of the invention are illustrated, which, together with the general description given above, and the detailed description given below, demonstrate this invention.

FIGS. 2a and 2b are side views of the cable gun lock of FIG. 1;

FIG. 3 is a front view of the cable gun lock of FIG. 1;

FIG. 4 is a bottom view of the cable gun lock of FIG. 1;

FIG. 31 is a partial, cross-sectional view of the cable lock of FIG. 28 shown in the locked position; and FIG. 32 is a partial, cross-sectional view of the cable lock of FIG. 28 shown in the unlocked position.

DETAILED DESCRIPTION OF THE INVENTION

Figure 1:
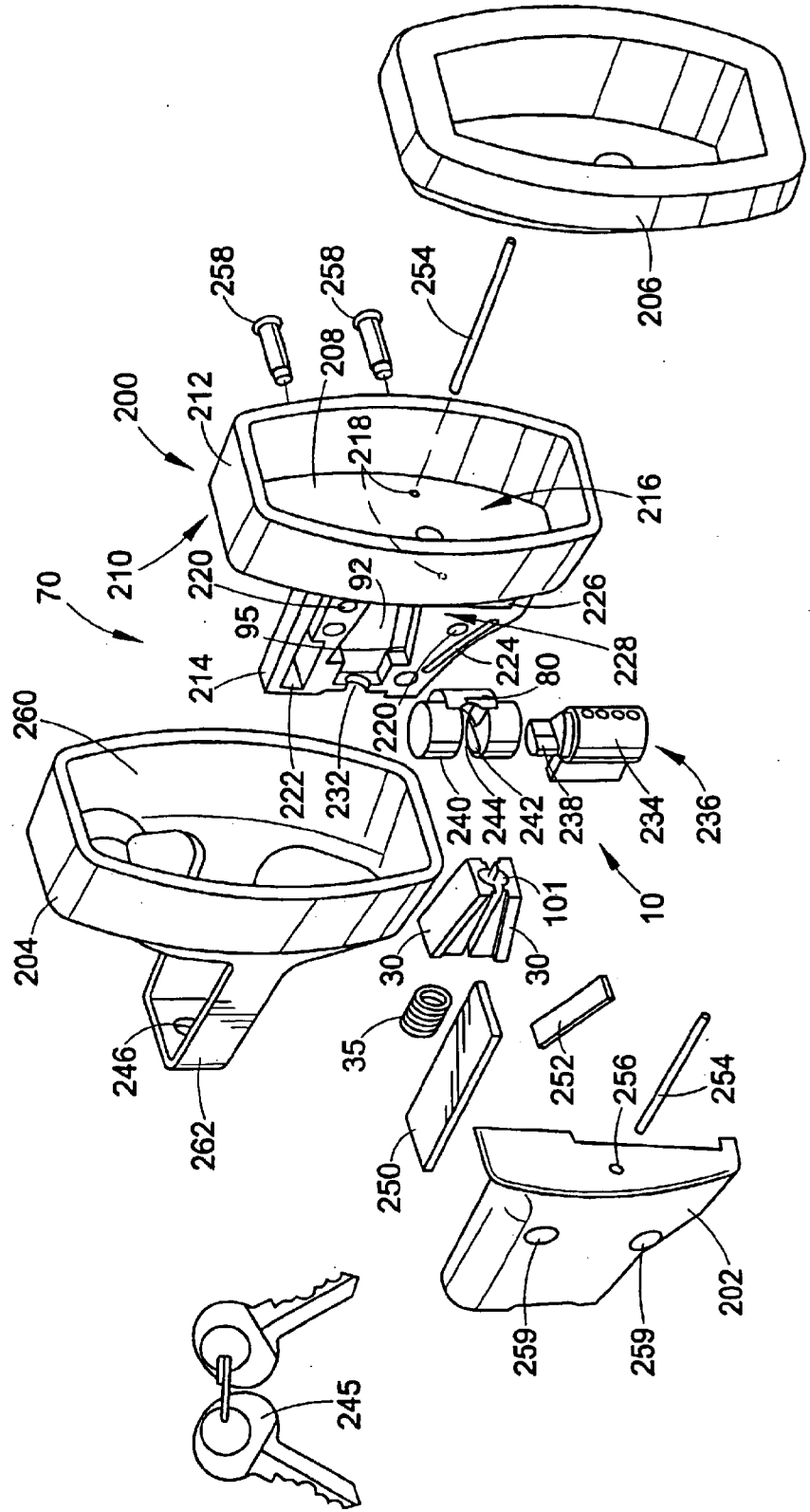
FIG. 1 is an exploded view of a cable gun lock incorporating the locking mechanism of the present invention.
Figure 5:
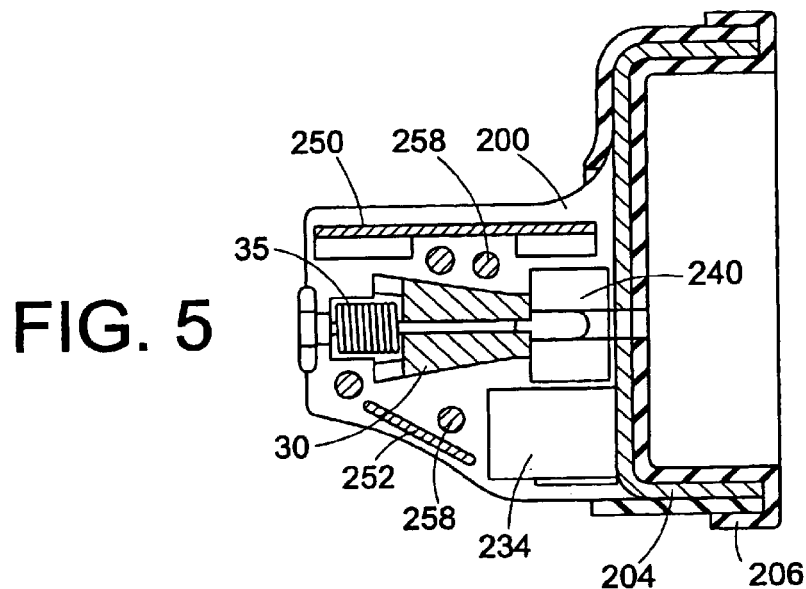
FIG. 5 is a cross-sectional view of the cable gun lock of FIG. 4 taken through A—A.
Figure 6:
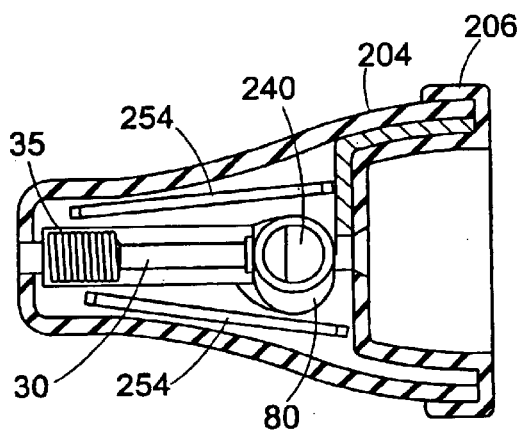
FIG. 6 is a cross-sectional view of the cable gun lock of FIG. 2 taken through B—B.

The cable locking mechanism, generally referenced as 10, includes a lever arm 20 or 340 one or more locking clamps 30, a locking clamp spring 35, a cable passageway 40, and an actuation means 45, typically a lock cylinder 47 or a hasp 48, for engaging and moving the lever aim 20. The cable locking mechanism 10 is generally designed to be used in a cable lock 50, which includes a cable 60 which is flexible or relatively flexible or a rigid rod and lock body 10.

The lever arm 20 can take a variety of shapes and sizes. The lever arm 20 is moved or rotated by the actuation means 45 to engage the locking clamps 30 in at least two different positions. As such, the lever arm 20 is generally a cylindrical piece with a protrusion 80 on one edge. Alternatively, the lever arm 20 may be asymmetrical, such that one side of the lever arm 20 acts as a protrusion. Alternatively, the lever arm 20 may have a generally ovular cross-section. Regardless of the chosen geometrical design of the lever arm 20, the principle feature is that the lever arm 20 engages the locking clamps in two different positions based on the movement or orientation of the lever arm 20. For example, if the lever arm 20 is cylindrical with a protrusion 80, as the lever arm 20 is rotated by the actuation means 45, the locking arm 20 rotates from a position wherein the cylindrical portion 81 contacts the locking clamps 30 to a position wherein the protrusion 80 contacts the locking clamps 30. The difference in the engagement position of the lever arm 20 produces a displacement of the locking clamps 30 which produces a locked and unlocked position, as described herein below. Alternatively, the locking clamps 30 do not need to engage the lever arm 20 when the lever arm is in the orientation where the protrusion 80 is rotated away from the locking clamps 30. In this embodiment, the locking clamps 30 will be displaced when the lever arm 20 is rotated to engage the locking clamps 30.

Figures 17, 18:
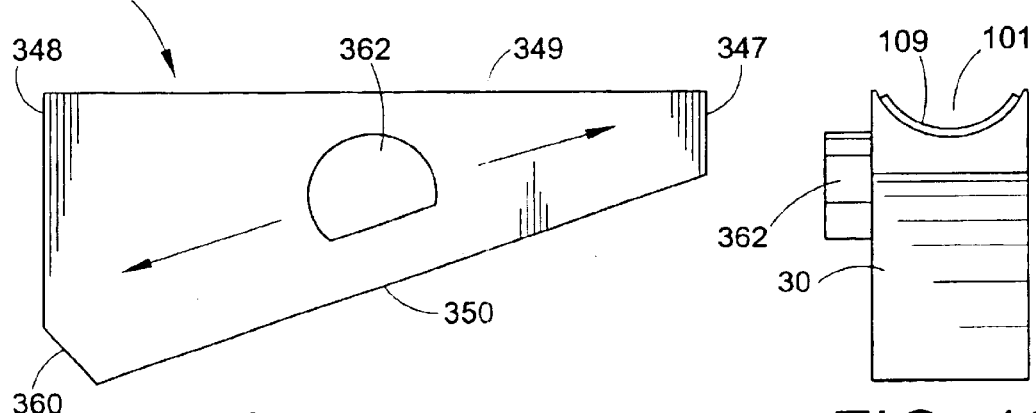
FIG. 17 is a side view of a locking clamp.
FIG. 18 is a front view of a locking clamp.
Figure 29:
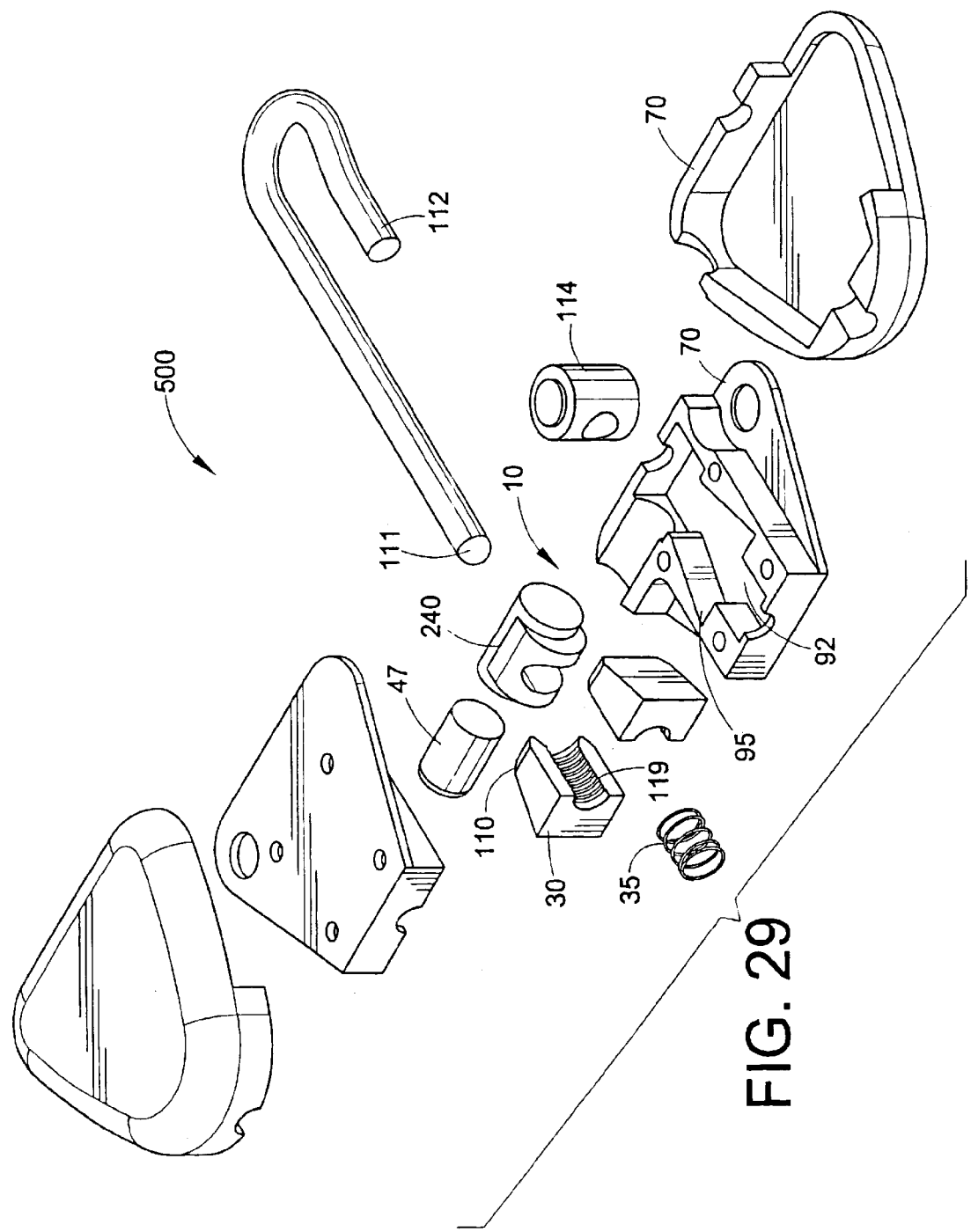
FIG. 29 is a stet exploded view of the cable lock of FIG. 28.
Figure 30:
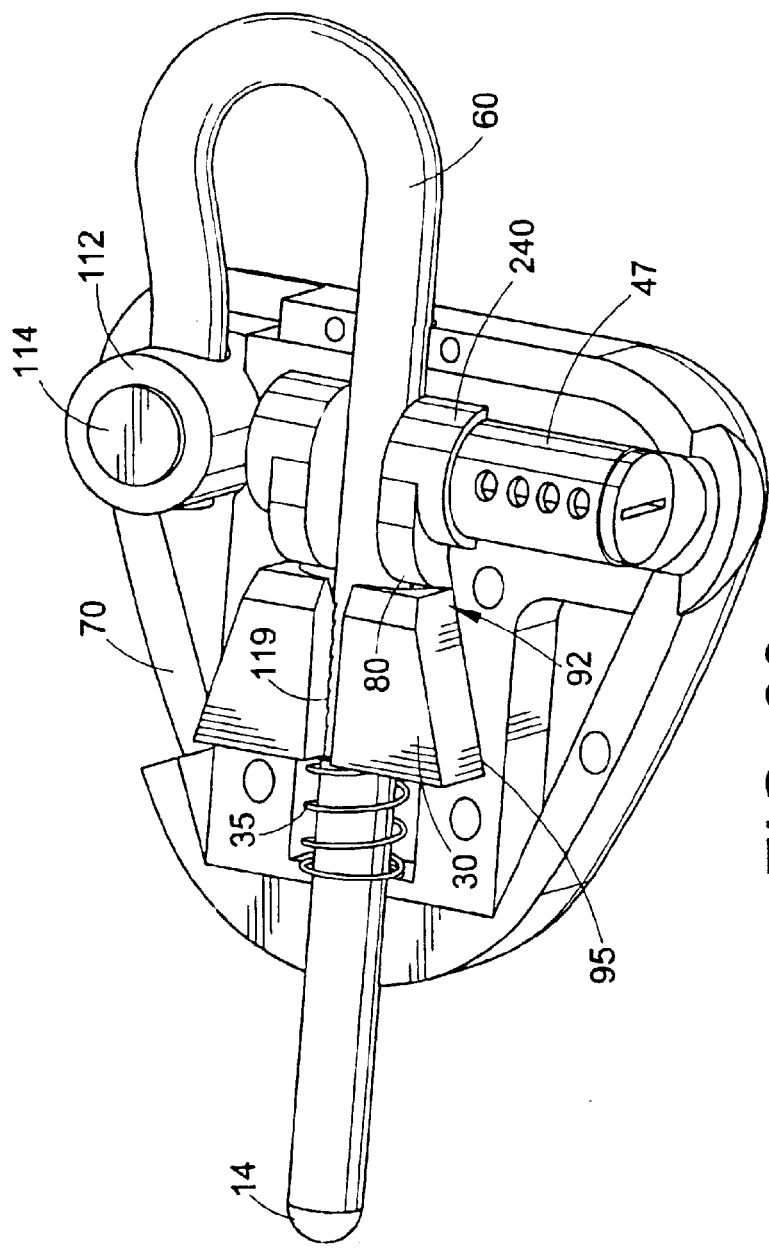
FIG. 30 is a partially assembled view of the cable lock of FIG. 28.
Figure 28:
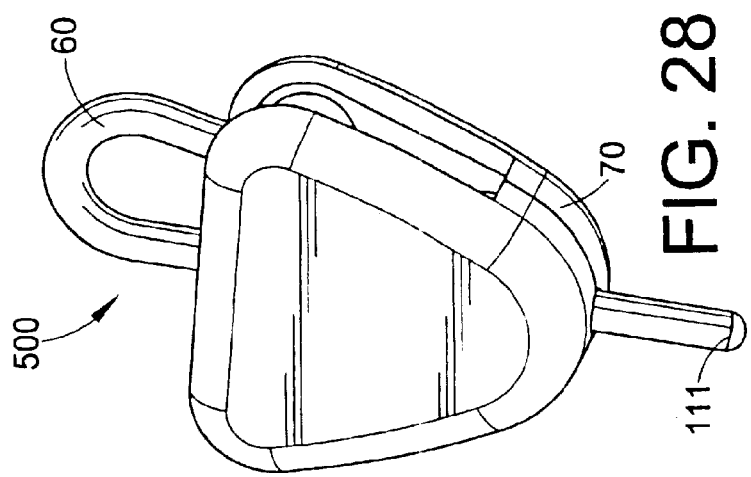
FIG. 28 illustrates an alternate embodiment of a cable lock incorporating the cable locking mechanism of the present invention.

The locking clamps 30 are positioned within a cavity 90 of the cable lock body 70, such as to be generally parallel with the cable passageway 40 which generally runs from one side of the lock body to the other, but not necessarily at 180 degrees through the center axis of the lock body 70. The locking clamps 30 are positioned in locking clamp openings 92 which generally abut the portion of the cavity 90 which houses the lever arm 20. The locking clamp openings 92 are defined by two surfaces 95 which slope outward away from the center axis of the cable passageway 40. The sloped surfaces 95 are orientated such that the narrower end of the slope is directed closer to the lever arm 20 than the wider end of the slope. The locking clamps 30 are generally wedged shaped with a bottom surface 97 which is sloped to match the slope of the opening surfaces 95. Thus, when the lever arm 20 engages the locking clamps 30 to cause displacement, the locking clamps 30 slide along the sloped surfaces 95 thereby widening the cable passageway 40 through the locking clamps 30. The top surface 99 of the locking clamps 30 contains a generally hemispherical groove 101, as best shown in FIG. 18, wherein the cable or rod 60 rests. Although the groove 101 need not be hemispherical, a hemispherical groove is preferred as it provides a better mating surface with the cable than other configurations. The groove 101 contains a set of toothed protrusions 109 that run perpendicular to the cable or rod 60 length, across the surface of the groove 101. The toothed protrusions 109 assist in with the grasping and retaining the cable or rod 60 as it is inserted through the cable passageway 40. Preferably each protrusion 109 is arranged in an asymmetrical fashion, with one side of the toothed protrusion 109 slightly longer than the other with the protrusion 109 and angled away from the lever arm 20. The angling of the protrusions 109 helps secure the cable in place and prevents the cable or rod 60 from degradation and eventual failure. The locking clamps 30 may also include chamfered surfaces 110, as shown in FIG. 29, in order to make it impossible to shim open the lock by inserting a tool into the cable hole and pushing on the locking clamps 30.

In an alternative embodiment, one of the locking clamps 30 is replaced by a surface 95' in the locking clamp opening 92. The surface 95' does not need to be sloped, but preferably still contains the toothed protrusions 109.

Within the locking clamp opening 92 is the locking clamp spring 35 that biases the locking clamps 30 toward the lever arm 20. When in the locked position, the spring 35 applies sufficient force on the locking clamps 30 to allow the clamps to secure the cable or rod 60 within the grooves 101. The movement of the lever arm 20 engages the locking clamps 30 and displaces the locking clamps 30 against the spring force.

The actuation means 45 may be a lock cylinder 47 or a hasp 48. The movement of the actuation means 45 is used to move the lever arm 20. The actuation means 45 contains the locking mechanism 103, such as a lock cylinder keyway 104 or a padlock 402. The actuation means 45 may take numerous different configurations and designs provided it provides for movement of the lever arm 20 and contains a locking mechanism 103. The specific embodiments detailed below will provide illustrative examples of the actuation means 45, however it should be appreciated that other actuation means may be used and are thus incorporated into this application as part of the invention to the extent that they are covered by the claims contained herein.

Figure 7:
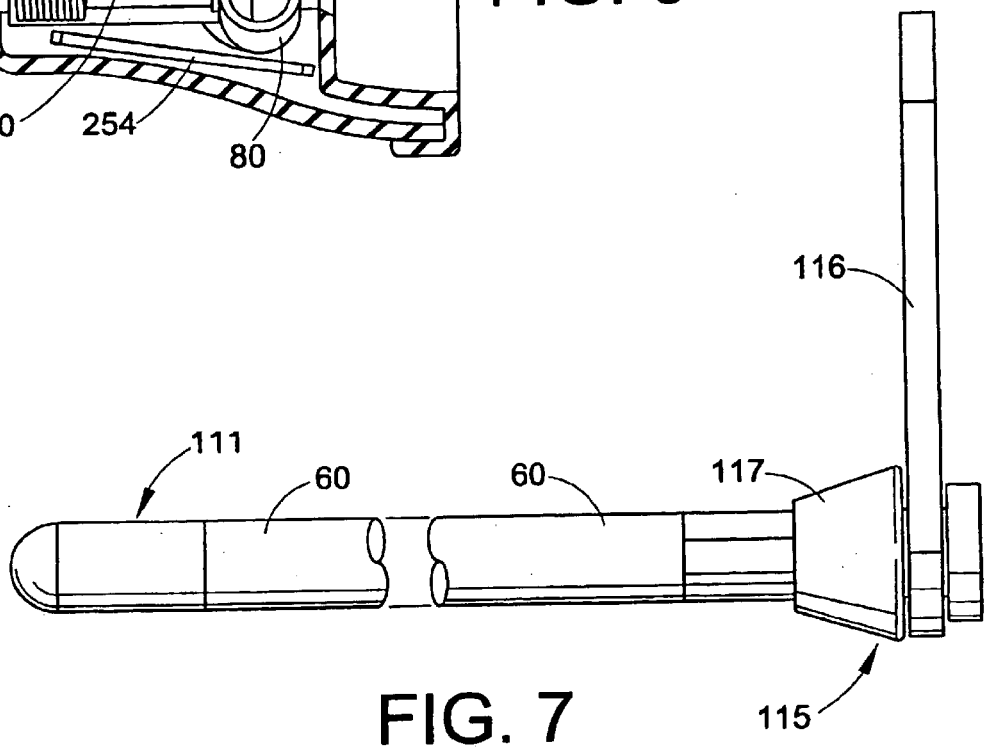
FIG. 7 is a side view of the cable assembly of the cable gun lock.

The flexible cable 60 is preferably made of a flexible laminated steel, and is more preferably an impregnated cable. Impregnated cable means that plastic is extruded between the wire strands of the cable. Alternatively, the cable 60 can be covered by a plastic sleeve. Preferably, the cable 60 is a braided cable with seven chords, wherein each chord is made from three strands of seven wires. The cable 60 can vary in length and diameter. The cable 60 comprises a formed end 111, which is preferably rounded for the purpose of easy insertion into the cable passageway 40, or the barrel of a gun as described below in the gun lock embodiment. The other end of the cable 112 may either be affixed to the lock body 70 or be loose. If the cable end 112 is affixed to the lock body 70, it is preferred to attach the cable end to a swivel 114 to allow the cable 60 move be easier to manipulate. Alternatively, as shown in FIG. 7, the other end of the cable 112 includes an attached end 115 that is crimped to the cable 60 and includes a tab 116 and a spacer 117 that is between the tab 116 and the cable 60. The use of this type of cable 60 will be described below with regard to the gun lock embodiment or the cable lock. In some embodiments, the cable 60 may be replaceable by disengaging the cable from the swivel 114 connection.

Figure 9:
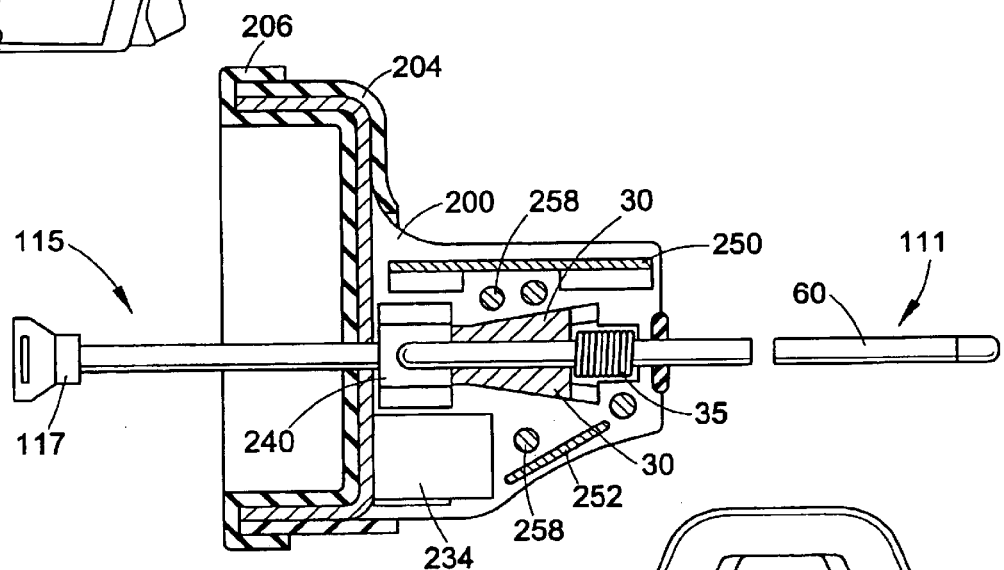
FIG. 9 is a partial, cross-sectional side view illustrating the cable assembly inserted through the lock body of the cable gun lock.
Figure 10:
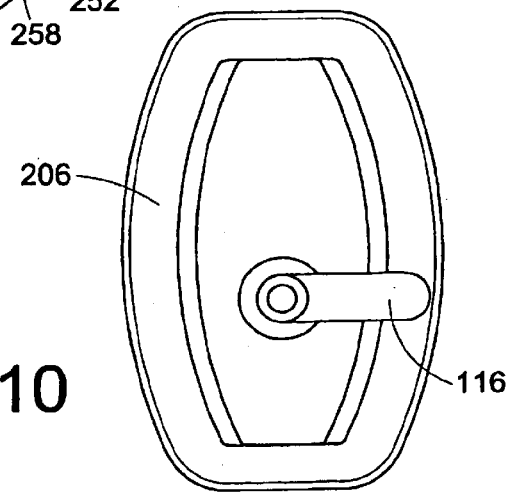
FIG. 10 is a front view of the cable gun lock as shown in FIG. 9.
Figure 11:
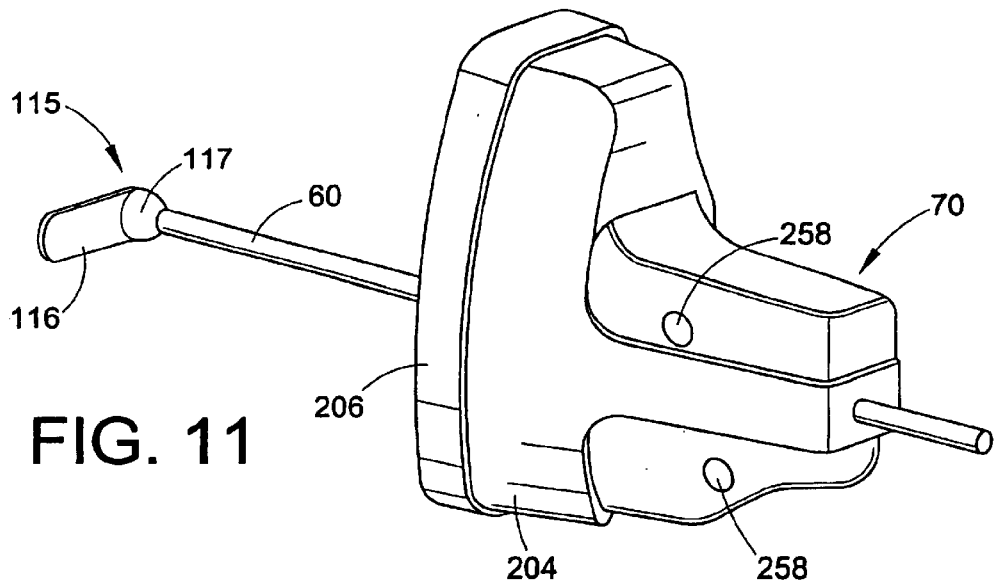
FIG. 11 is a view of the cable assembly inserted through the lock body of the cable gun lock.

It should further be understood that the use of the term cable, as used herein, may also include a rigid rod of the type illustrated in FIG. 9. Such a rod is substantially rigid and manufactured of a metal material such as stainless steel to resist cutting or other tampering in attempt to remove the rod.

The lock body 70 may take on a variety of shapes and sizes. Preferably the lock body 70 is resilient and may include one or more anti-saw plates. In general, the preferred configuration of the lock body 70 is dependent on the desired application of the lock, and thus further details regarding the lock body will be deferred to the specific embodiments disclosed below.

In order to engage a cable lock 50 using the locking mechanism 10 described above, the actuation means 45 is deployed, thereby moving the lever arm 20 into engagement with the locking clamps 30. In this position, the cable 60 can freely move in and out of the cable passageway 40. The cable 60 is looped around the object which the lock will secure and the formed end 111 is inserted into the cable passageway 40 through cable passageway opening 120. The cable 60 can be positioned while the lock is in the unlocked position or while the lock is in the locked position. If the cable 60 is inserted while the lock is the locked position, the cable 60 can advance into the lock body 70 but may not be withdrawn. In order to place the lock in the locked position, the actuation means 45 is deployed to position the lever arm 20 out of engagement with the locking clamps 30, or alternatively to a position of engagement wherein the locking clamps 30 are moved as far as possible under the exertion of the spring force. The spring 35 exerts a force on the locking clamps 30 to slide them up the sloped surfaces 95 towards the lever arm 20. As the locking clamps 30 move towards the lever arm 20, the cable passageway 40 through the locking clamps 30 get narrower, until the cable is eventually engaged within the grooves 101 in the locking clamps 30. The toothed protrusions 109 hold the cable 60 in position and prevent the cable from being withdrawn from the lock body 70. As mentioned above, the cable 60 can be advanced further into the lock body 70, or in other words cinch the cable, but can not be withdrawn. Any attempt to withdraw the cable 70 will result in the movement of the locking clamps 30 towards the lever arm 20 thereby providing a tighter grip on the cable 60.

To disengage the lock, the actuation means 45 is deployed to move the lever arm 20 into engagement with the locking clamps 30. The engagement of the locking clamps 30 will displace them downward along the sloped surfaces 95 thereby increasing the cable passageway 40 through the locking clamps 30 and moving the locking clamps 30 out of engagement with the cable 60. The cable 60 will thus be permitted to move in either direction, namely into the lock body 70 or out of the lock body 70.

The remainder of this application will be devoted to specific embodiments of cable locks which employ the cable locking mechanism of the present invention. These illustrative embodiments are meant to describe specific application of the cable locking mechanism and illustrate the general principles covered by this application. The scope of this application should not be limited to the specific embodiments described herein, but should also include modifications that are within the scope of the claims of this application. For purposes of convenience and ease of reference, similar elements in each of the embodiments will maintain similar reference numbers.

Illustrative Embodiments of the Invention

Adjustable Cable Gun Lock First Embodiment

Referring to FIG. 1, the lock body 70 comprises a lock housing 200, a cable locking mechanism 10, two side coverings 202, an outer lock housing cover 204, and an inner lock housing cover 206. The lock housing 200 comprises a single piece of metal, preferably die-cast zinc. The lock housing 200 comprises a flat portion having a front 208 and a rear 210, a rim 212, and an extended portion 214. The front of flat portion 208 has a front cable opening 216 and two anti-saw pin openings 218. The front of flat portion 208 of the lock housing 200 contacts, mates with and covers the firearm muzzle when the assembled cable gun lock is attached to a firearm. Attached to the front of flat portion 208 is a rim 212 that forms a seal around the front of the firearm barrel when the assembled cable gun lock is attached to a firearm. The extended portion 214 of the lock housing 200 has rivet openings 220, a top anti-saw plate opening 222, a bottom anti-saw plate opening 224, a pin tumbler opening 226, a cylinder extension opening 228, a locking clamp opening 92, and a rear cable opening 232.

The cable locking mechanism 10 comprises a pin tumbler cylinder 234, a key opening 236, and a notch 238. The pin tumbler cylinder 234 fits into the pin tumbler opening 226 of the extended portion 214 of the lock housing 200. A cylinder extension 240, which acts as the lever arm 20 in this embodiment, has a protruding extension 80, a slot 242, and a notch opening 244. The cylinder extension 240 fits into the cylinder extension opening 228 of the extended portion 214 of the lock housing 200. When fitted into their respective openings in the lock housing 200, the notch 238 of the pin tumbler cylinder 234 fits into and engages the notch opening 244 of the cylinder extension 240. When the proper key 245 is inserted into the key opening 236 and rotated, the pin tumbler assembly 234 rotates and causes rotation of the cylinder extension 240.

The cable locking mechanism 10 also comprises locking clamps 30 that have a cable groove 101. Two locking clamp 30 fit into the locking clamp opening 92 of the extended portion 214 of the lock body 200. The locking clamps 30 slide along the sloped surfaces 95 of the locking clamp opening 92, which are tapered from back to front. Also fitting into the locking clamp opening 92 of the extended portion 214 of the lock housing 200 is a locking clamp spring 35. The locking clamp spring 35 contacts one end of both locking clamps 30 and biases them forward against the cylinder extension 240. Movement of the locking clamps 30 forward, toward the front of flat portion 208 of the lock housing 200, is referred to as the "locked" position of the cable locking mechanism 10. Movement of the locking clamps 30 backward, toward the cable hole 246 in the outer lock housing cover 204, is referred to as the "unlocked" position of the cable locking mechanism 10. The mechanism by which the cable locking mechanism 10 is put into the locked and unlocked positions, and the result of this, is described later in this application.

Optionally, a top anti-saw plate 250 can be fit into the top anti-saw plate opening 222 in the extended portion 214 of the lock housing 200. Likewise, a bottom anti-saw plate 252 can be fit into the bottom anti-saw plate opening 224 in the extended portion 214 of the lock housing 200. A side covering 202 is fit onto either side of the lock housing 200. An anti-saw pin 254 can be then inserted into the two anti-saw pin openings 218 in the front of flat portion 208 of the lock housing 200. When so inserted, each anti-saw pin 254 lodges in the anti-saw pin hole 256 found in each side covering 202 and secures each housing to the lock housing 200. Rivets 258 are inserted into rivet holes 259 of the side covering 202 on one side of the extended portion 214. The rivets 258 pass through the rivet openings 220 of the extended portion 214 of the lock housing 200 and enter into the rivet holes 259 of the side covering 202 on the opposite side of the lock housing 200, thus additionally securing the lock housing 200, the cable locking mechanism 10 and the two side coverings 202 together as a single piece.

An outer lock housing cover 204 and an inner lock housing cover 206 preferably comprise a single piece of plastic or rubber. The outer lock housing cover 204 comprises a receiving portion 260 and a rear portion 262, the rear portion 262 having a cable hole 264. The single piece comprising the lock housing 200, the cable locking mechanism 10 and the two side coverings 202 is slid into the receiving portion 260 of the outer lock housing cover 204 and secured therein by conventional means. The inner lock housing cover 206 is also slid onto the front 208 of the lock housing and secured therein by conventional means. So assembled, the components comprise the lock body 70 of the cable gun lock of the present invention.

Referring now to FIG. 7, the cable assembly comprises a cable 60 which can vary in length. The cable 60 comprises a formed end 111, which is preferably rounded for the purpose of easy insertion into the chamber and firearm barrel to which the cable gun lock is to be attached. The other end of the cable assembly comprises an attached end 113 that is crimped to the cable 60. The attached end 113 comprises a tab 116 and a spacer 117 that is between the tab 306 and the cable 60.

The present cable gun lock is designed to be used with any firearm that comprises a barrel with a muzzle end and a chamber at the opposite end of the barrel (i.e., the breech area of the firearm). To use the present cable gun lock, there must be no cartridges in the chamber of the firearm to which the cable gun lock is to be attached. The breech of the firearm must be open, allowing access to the chamber and to the firearm barrel. With the breech of the firearm in an open position, the formed end 111 of the cable assembly is inserted into the chamber of the firearm, pushed through the firearm barrel and out through the firearm muzzle. Once the formed end 111 of the cable assembly exits the end of the firearm muzzle, the formed end 111 of the cable assembly is grasped by the operator and pulled taut until it is no longer possible to pull a further length of cable 60 from the firearm muzzle. When the cable 60 is taut, the attached end 113 of the cable assembly is preferably lodged in or near the chamber of the firearm. Most preferably, the spacer 117 of the cable assembly enters into the chamber of the firearm, blocking the chamber, and the tab 116 protrudes from the chamber of the firearm preventing the cable assembly from being pulled through the firearm barrel and out of the firearm muzzle.

Once no further length of cable 60 can be pulled from the firearm muzzle, the formed end 111 of the cable assembly that is protruding from the firearm muzzle is inserted into the front cable opening 216 of the lock housing 200, the lock housing 200 now being part of the lock body 70 of the cable gun lock, as described above and as shown in FIGS. 8 and 9. As the formed end 111 of the cable assembly continues to be pushed through the front cable opening 216 of the assembled lock body 70 of the cable gun lock, the formed end 111 passes through the slot 242 of the cylinder extension 240, enters the cable groove 101 of the locking clamps 30, passes through the center of the locking clamp spring 35 and the rear cable opening 232 of the extended portion 214 of the lock housing 200 and, finally, exits the assembled lock body 70 of the cable gun lock through the cable hole 264 of the outer lock housing cover 204.

Figure 8:
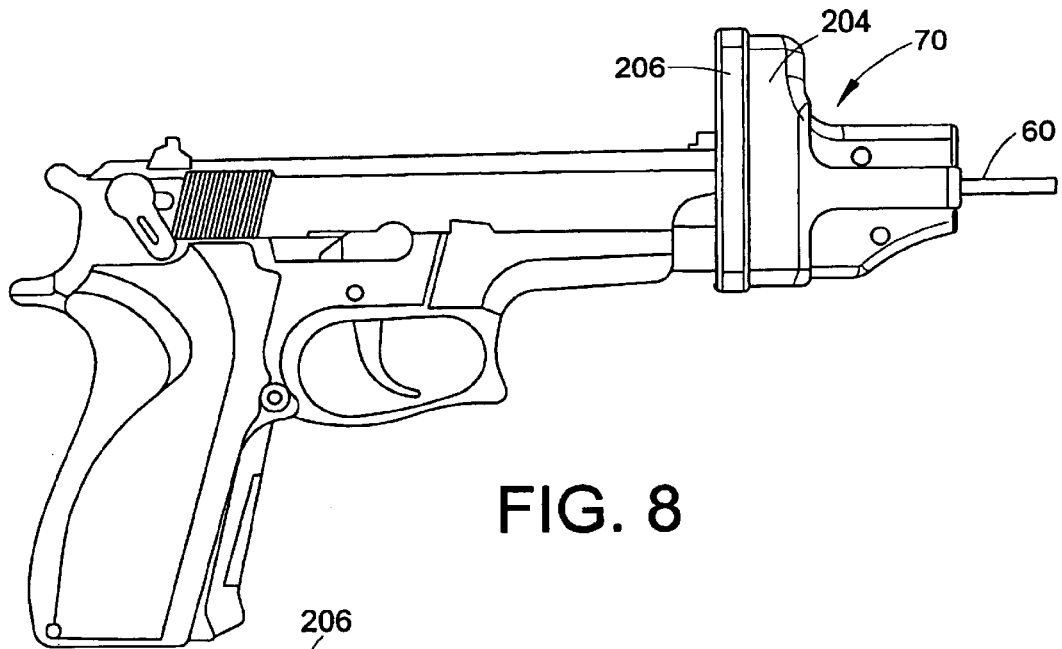
FIG. 8 is a side view of the cable gun lock of the present invention attached to a handgun.

So inserted into the main body of the cable gun lock, the main body of the cable gun lock is further slid down the length of the cable 60 protruding from the firearm muzzle, until the front of flat portion 208 of the lock body 200 of the assembled main body of the cable gun lock, covered by the inner lock housing cover 206, mates with the firearm muzzle and the rim 212 forms a seal around the end of the firearm barrel. When the cable gun lock is so attached to a firearm, as shown in FIG. 8, the locking mechanism 10 of the cable gun lock is locked with a key 245 so that the cable gun lock cannot be removed from the firearm.

Referring now to FIG. 9, insertion of the formed end 111 of the cable 60 into the main body of the cable gun lock is shown in the absence of a firearm.

As described above, the lock body 70 of the present gun lock comprises a cable locking mechanism 10. When the lock body 70 of the gun lock is slid over the formed end 111 of the cable 60, as shown in FIG. 8 in the case where the cable gun lock is attached to a firearm, in the case where the cable gun lock is not attached to a firearm, locking of the cable locking mechanism 10 prevents movement of the lock body 70 of the cable gun lock along the inserted cable 60, toward the formed end 111. Although a variety of mechanisms for locking the lock body 70 of the cable gun lock onto the cable 60 are possible, the locking mechanism 10 is shown in FIGS. 12A and 12B.

Figure 12A:
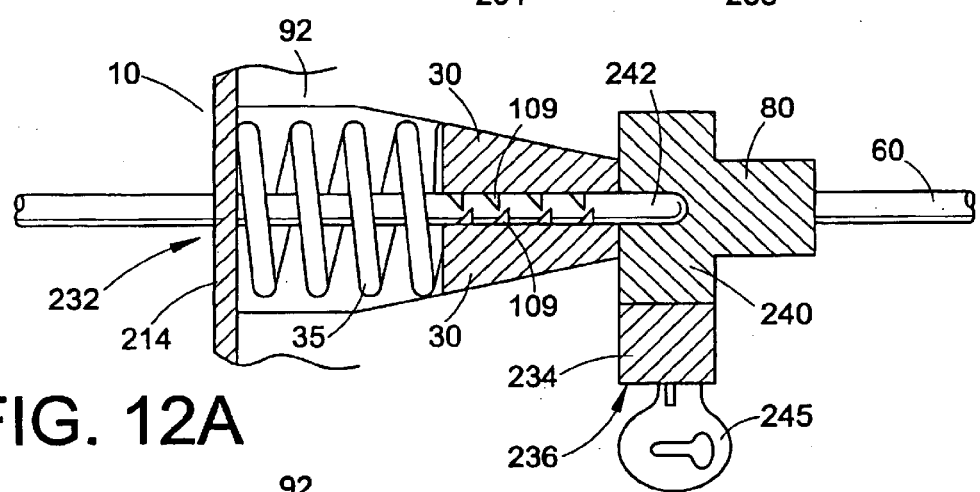
FIG. 12A is a partial, cross-sectional side view of the cable locking mechanism of the cable gun lock in the locked position.

As shown in FIG. 12A, when the key 245 is inserted into the key opening 236 of the pin tumbler assembly 234 and rotated such that the protruding extension 80 of the cylinder extension 240 does not contact and releases the locking clamps 30, the locking clamp spring 35 pushes the locking clamps 30 forward along the sloped surfaces 95 of the locking clamp opening 92 such that the locking clamps 30 contact the cable 60 and provide a locking force. The locking clamps 30 preferably have teeth 109 that grip the cable 60. So positioned, the cable 60 is unable to move through the main body in a direction (rightward in FIG. 12A) that would allow the lock body 70 of the cable gun lock to slide off the formed end 111 of the cable 60. In fact, when an attempt is made to slide the lock body 70 in the rightward direction along the cable, the locking clamps 30 apply additional locking force to the cable 60. This is referred to as the "locked" position of the cable gun lock. When the cable gun lock is attached to a firearm, as shown in FIG. 8, and in the locked position, the cable gun lock cannot be removed from the firearm without unlocking the cable gun lock using the proper key.

When in the locked position, it is possible for the cable 60 to slideably move through the lock body 70 of the cable gun lock in a direction toward the attached end 113 of the cable 60 (leftward in FIG. 12A). When attached to a firearm, as shown in FIG. 8, such movement only allows the main body of the cable gun lock to move into tighter contact with the firearm muzzle. In the locked position, therefore, the locking mechanism assembly acts as a cinch. This feature allows the operator to attach the cable gun lock to a firearm even when the locking mechanism 10 is in the locked position. When the operator inserts the cable 60 into the lock body 70 when the cable gun lock is in the locked position, the locking clamps 30 slide along the sloped surfaces 95 of the locking clamp opening 92 such that the locking clamps 30 do not apply a locking force to the cable 60.

Figure 12B:
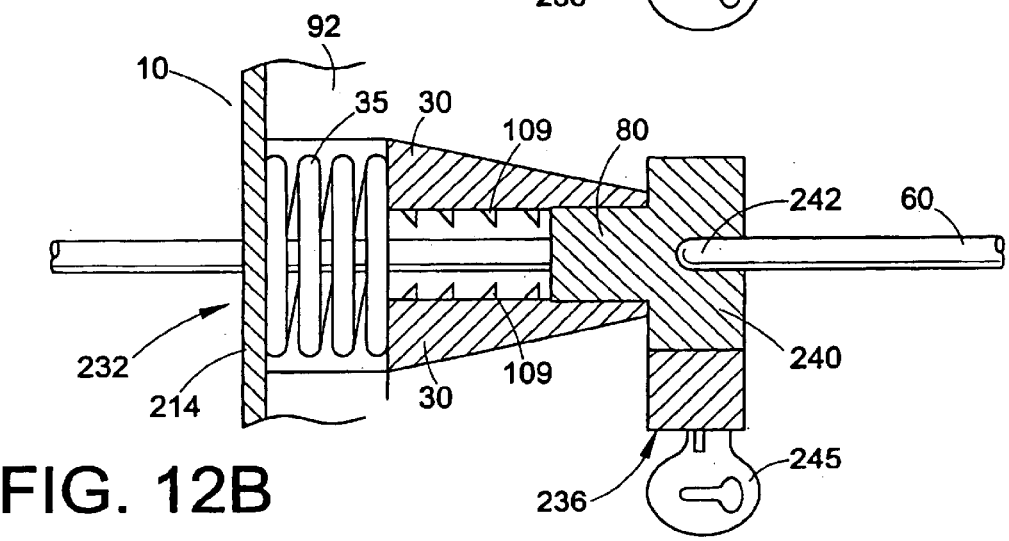
FIG. 12B is a partial, cross-sectional side view of the cable locking mechanism of the cable gun lock in the unlocked position.

As shown in FIG. 12B, when the key 245 is inserted into the key opening 236 of the pin tumbler assembly 234 and turned such that the protruding extension 80 of the cylinder extension 240 does contact the locking clamps 30, the protruding extension 80 pushes the locking clamps 30 backward such that the locking clamps 30 do not contact the cable 60. So positioned, the cable 60 is able to move in both directions (rightward and leftward in FIG. 12B) through the lock body 70 of the cable gun lock. This is referred to as the "unlocked" position of the cable gun lock. In this position, it is possible to slide the lock body 70 of the cable gun lock on or off of the cable 60 in order to either attach the cable gun lock to or detach the cable gun lock from a firearm.

When attached to a firearm a portion of the cable gun lock should be apparent. It is not possible to load or discharge the firearm while the cable gun lock is properly attached to the firearm. It is also not possible to close the breech of the firearm when the cable gun lock is properly attached. If the firearm to which the cable gun lock is attached is a revolver, and if the cable gun lock had been attached to the revolver when the rotating cylinder was in the open position, it is not possible to close the cylinder of the revolver when the cable gun lock is attached. Also, protrusion of the tab 116 from the chamber of the firearm indicates that something has been placed down the firearm barrel. Another feature is that the rim 212 of the large body 200 overlaps the front of the firearm barrel in such a way that no cable 60 is exposed or visible between the muzzle of the firearm and the lock body 70. This prevents sawing of the cable or twisting of the lock by someone wishing to remove the cable gun lock from the firearm to which it is attached. Sawing of the main body of the cable gun lock, in order to disengage the locking mechanism assembly for example, and remove the cable gun lock from the attached firearm is prevented by the anti-saw pins 254, the top anti-saw plate 250 and bottom anti-saw plate 252. When the cable gun lock is attached to a firearm it is possible to cut the cable 60 that protrudes from the assembled lock body 70 of the cable gun lock through the cable hole 264 of the outer lock housing cover 204. However, cutting of this cable 60 does not result in removal of the cable gun lock from the firearm and does not result in the cable gun lock being inoperative.

Also the present cable gun lock is that the lock is adjustable to fit a variety of different types and sizes of firearms. The cable gun lock is adjustable through the use of different spacers 117 that are used in the cable assembly. Spacers of a variety of different sizes are provided to adjust both for firearms of different calibers and for different barrel lengths. To use different spacers, the operator slides the correct spacer 117 down the cable 60 and snaps the spacer 117 to the tab 116. The cable assembly, now with the selected spacer, is inserted into the chamber of the firearm and out the firearm muzzle as described earlier.

It should be noted, therefore, that the present cable gun lock can be attached to a variety of different types of firearms. The types of firearms to which the cable gun lock can be attached comprises revolvers, derringers, semi-automatic, and other types of handguns or pistols, and bolt-action, pump-action, lever-action, single-shot, semi-automatic, and other types of rifles. This listing is not meant to be inclusive of the types of firearms to which the present cable gun lock can be attached. Other types of firearms can be used.

Adjustable Cable Gun Lock Second Embodiment

Figure 13:
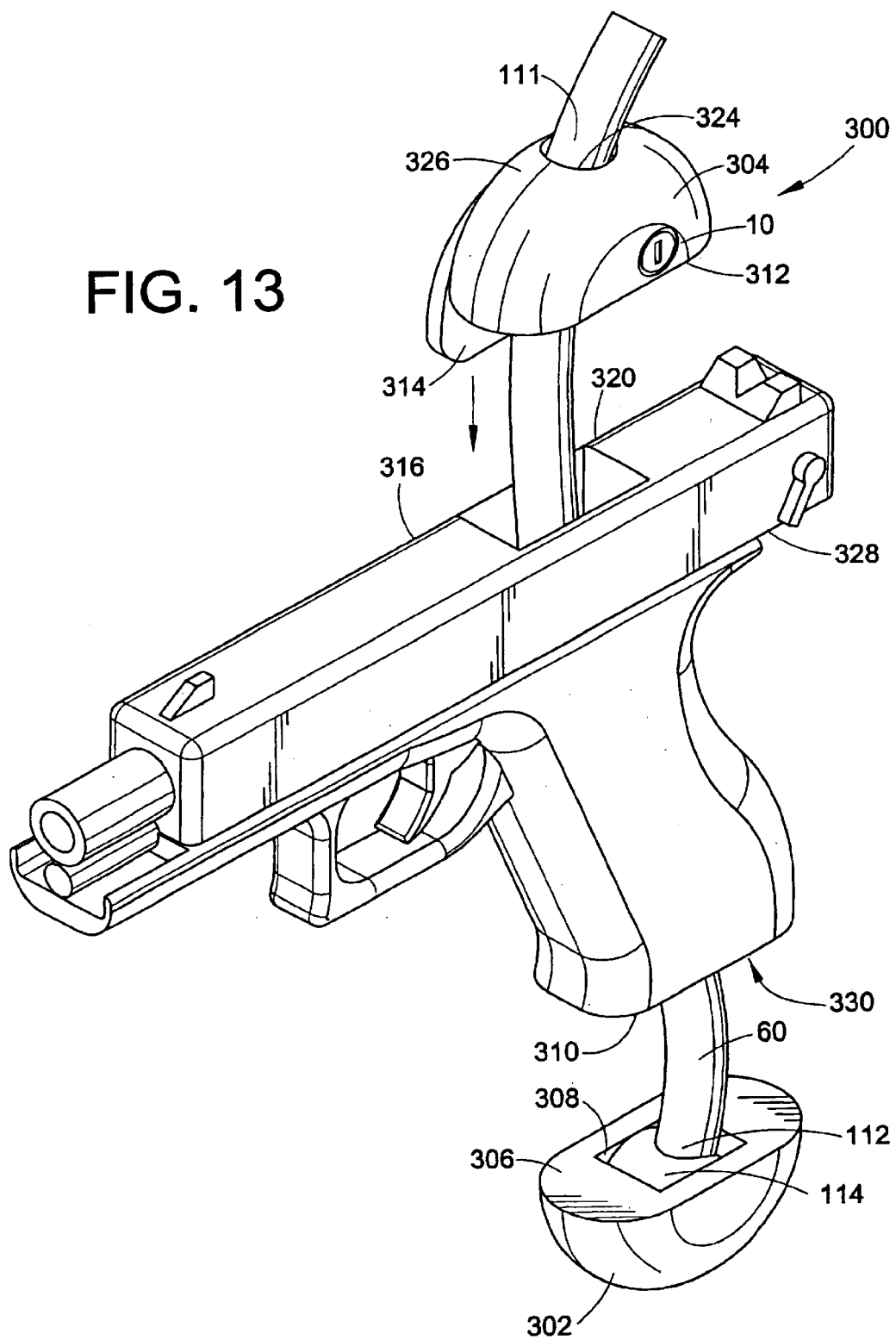
FIG. 13 illustrates an alternate embodiment of a cable gun lock incorporating the locking mechanism of the present invention which includes an upper and lower lock housing.
Figure 15:
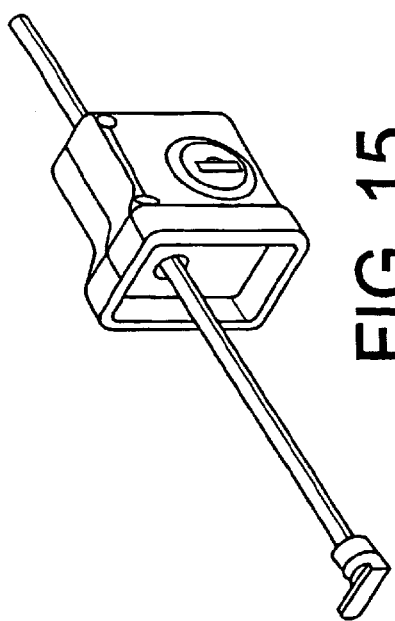
FIG. 15 is a perspective assembled view of the cable gun lock of FIG. 14.

As shown in FIG. 13, the gun lock assembly 300 comprises a cable 60, a lower housing unit 302, and an upper housing unit 304 with a cable locking mechanism 10. The lower housing unit 302, preferably comprised of die-cast zinc, has a top surface 306 with a recess 308 wherein a first end 112 of the cable 60 is affixed, preferably by a ball bearing 114 which allows the cable 60 to swivel. The lower housing unit 302 is molded such that the top surface 306 mates with the handle of a gun and a ridge 310 forms a seal around the base of the handle of the gun. Optionally, the lower housing unit 302 may also comprise a padded surface. The cable 60 interconnects the lower housing unit 302 and the upper housing unit 304. The upper housing unit 304, preferably comprised of die-cast zinc, has a lower surface 312 having a lip 314 formed for mating engagement with the barrel of the gun so that the lip 314 extends down the side 316 of the gun. The lower surface 312 of the upper housing unit 304 is of sufficient length to cover the ejection port 320 thereby prohibiting access to the ejection port 320 when the gun lock assembly is engaged. The upper housing unit 304 has a channel 324 running from the lower surface 312 to an upper surface 326 which is aligned for mating engagement with locking mechanism 10 located in the interior of the upper housing unit 304. A second formed end 111 of cable 60 passes through channel 324, and locking mechanism 10, to the upper surface 326 of the upper housing unit 304. Alternatively, the gun lock 300 may include only the upper housing unit 304, and the cable can be inserted down the barrel of the gun as shown in FIG. 15.

To engage the gun lock assembly 300, the slide 328 of gun must be locked back and all rounds must be removed from the gun chamber. The magazine is then removed thereby allowing access to the magazine well 330. The formed end 111 of cable 60 is passed through the magazine well 330, through the gun chamber, and out the ejection port 320 of the gun. The cable 60 is pulled taut thereby pulling the lower housing unit 302 into mating contact with the handle of the gun. The first end 112 of cable 60 can be swiveled while pulling the cable taut to allow the lower housing unit 302 to be aligned for mating contact with the handle such that ridge 310 forms a seal around the handle. The upper housing unit 304 is lowered over cable 60, by passing the second end 111 of cable 60 through channel 324 and out the upper surface 326 of the upper housing unit 304. The cable 60 is pulled taut until the upper housing unit 304 is in mating contact with the barrel of the gun thereby covering the ejection port 320. The lower surface 312 of the upper housing unit 304 is secured against the barrel and the lip 314 is secured against the side 316 of the gun prior to engaging the locking mechanism 10. When the locking mechanism 10 is engaged, the cable 60 is unable to move in relation to gun, thereby preventing firing of the gun. To disengage the gun lock assembly 300, the locking mechanism 10 is disengaged thereby releasing the cable 60. The upper housing unit 304 is slid off of the cable 60 and the lower housing unit 302 is pulled to remove the cable 60 from the gun.

Figure 16:
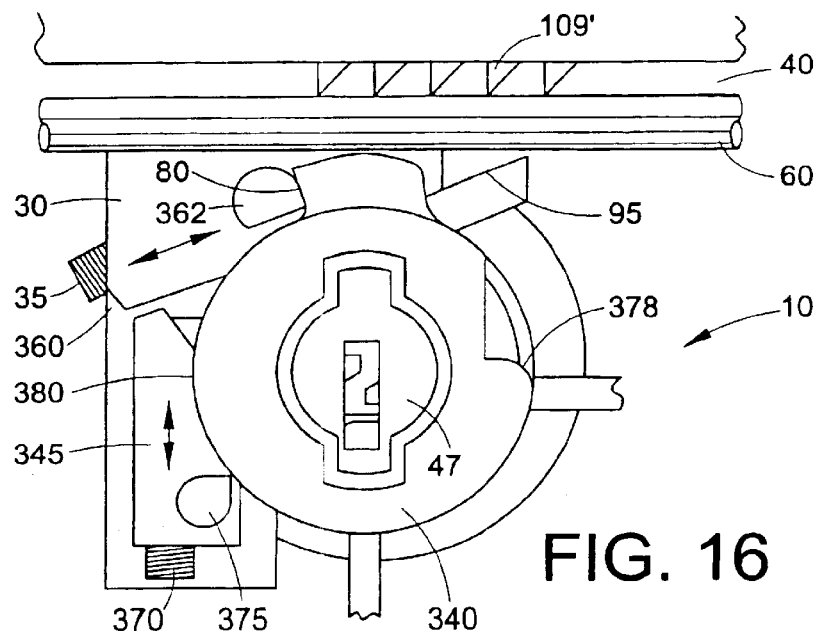
FIG. 16 is a close-up view of a cable locking mechanism, as described in the second embodiment of the cable gun lock.

The locking mechanism 10 is shown in FIG. 16 and comprises a cable passageway 40, a lock cylinder 47, a winch 340, a latch 345, a locking clamp 30, and a set of toothed protrusions 109' located on sloped surface 95'. The cable 60 passes through the cable passageway 40 and contacts the toothed protrusions 109 located on one side of the cable passageway 40 and the locking clamp 30, when in locked position.

The toothed protrusions 109' assist in with the grasping and retaining the cable 60 as it is inserted through the cable passageway 40. Preferably each protrusion 109' is arranged in an asymmetrical fashion and sloped as described above.

The locking clamp 30 is slidably disposed to move horizontally along the locking clamp opening 92 of the upper housing unit 304 to engage the cable 60. The locking clamp 30 is resiliently biased towards the cable 60 by locking clamp spring 35. The locking clamp 30, as shown in FIGS. 17 and 18, preferably has parallel front and back sides 347 and 348, a top side 349 and a bottom side 350. The top side 347 defines a groove 101 extending across the entire top side 347 of the locking clamp 30 for engaging the cable 60. Thus, groove 101 forms the bottom side of the cable passageway 40. As the locking clamp 30 is biased by spring 35 in a slidable fashion, the diameter of the cable passageway 40 is variable according to the slidable movement of the locking clamp 30. Toothed protrusions 109 are located along the bottom of groove 101 to assist with grasping and retention of the cable 60.

The bottom side 350 of the locking clamp 30 is sloped from the front side 347 downwardly toward the back side 348. The bottom side 350 is in an abutting contact with a sloping surface 95 of the upper housing unit 304 within the locking clamp opening 92, along which the locking clamp 30 slides when biased by spring 35. The spring 35 biases the locking clamp 30 such that the resultant force exerted by the spring 35 on the locking clamp 30 is in a direction substantially parallel to the sloped surface 95.

The locking clamp 30 further comprises cutout 360 between the back side 348 and bottom side 350 of the locking clamp 30. Additionally, a first knob 362 extends from the locking clamp 30. The details of the interface between the cutout 360 and the knob 362 will be discussed in greater details hereinafter.

Figure 19:
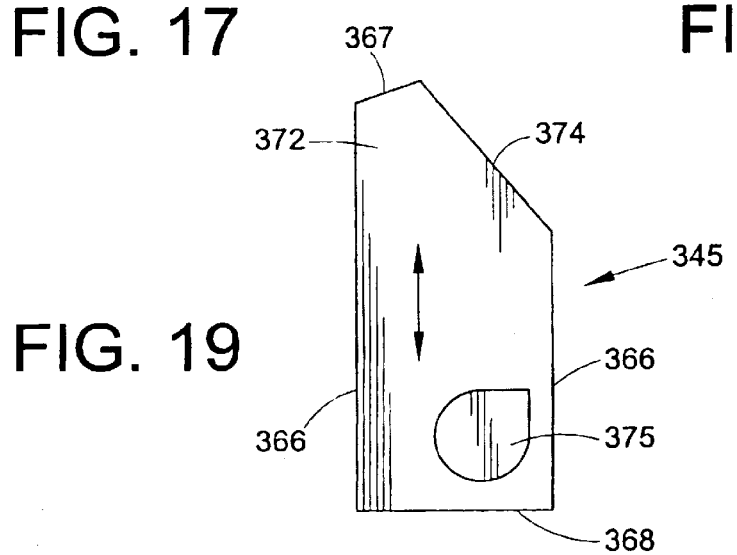
FIG. 19 is a side view of a latch which is a part of the cable locking mechanism as shown in FIG. 16.

The latch 345 is also disposed within the interior cavity 90 of the upper housing unit 304. The latch 345, as shown in FIG. 19, preferably has substantially parallel sides 366, a top side 367, and a bottom side 368. The latch 345 is resiliently biased within the interior cavity 90 by a second spring 370 in a vertical direction towards the locking clamp 30. Thus the latch 345 moves from a first lowered position to a second raised position, wherein the latch 345 moves towards, and eventually contacts, the locking clamp 30. The top side 367 of the latch 345 forms a wedge 372 that has a sloped surface 374. The angle of the sloped surface 374 is selected such that it corresponds in a complementary manner as to allowing mating engagement between the sloped surface 374 and the cutout 360 on the locking clamp 30 when the latch 345 is biased by spring 370. A second knob 375 is disposed on the latch 345, the function of which will be discussed hereinafter.

The winch 340, which acts as the lever arm 20 in this embodiment, is affixed to the lock cylinder 47 and has first and second protrusions 80 and 378 extending from the periphery of the winch 340 for engage the locking clamp 30 and latch 345 respectively. In the unlocked position, the first protrusion 80 engages the first knob 362 on the locking clamp 30 against the biasing force of spring 35 thereby preventing displacement of the locking clamp 30 by the spring 35. The cable passageway 40 is clear for insertion of the cable 60 when the first protrusion 80 is engaged.

The periphery portion 380 of the winch 340 is generally arcuate in shape, and engages the second knob 375 located on the latch 345 when the lock assembly is disengaged. The periphery portion 380 is in frictional contact with the second knob 375 on latch 345 thereby holds the latch 345 in place against the biasing force of spring 370. When the periphery portion 380 is in frictional contact with the second knob 375 the latch 345 is prevented from moving from its first lowered position upward to engage the cutout 360 of the locking clamp 30.

Figure 20:
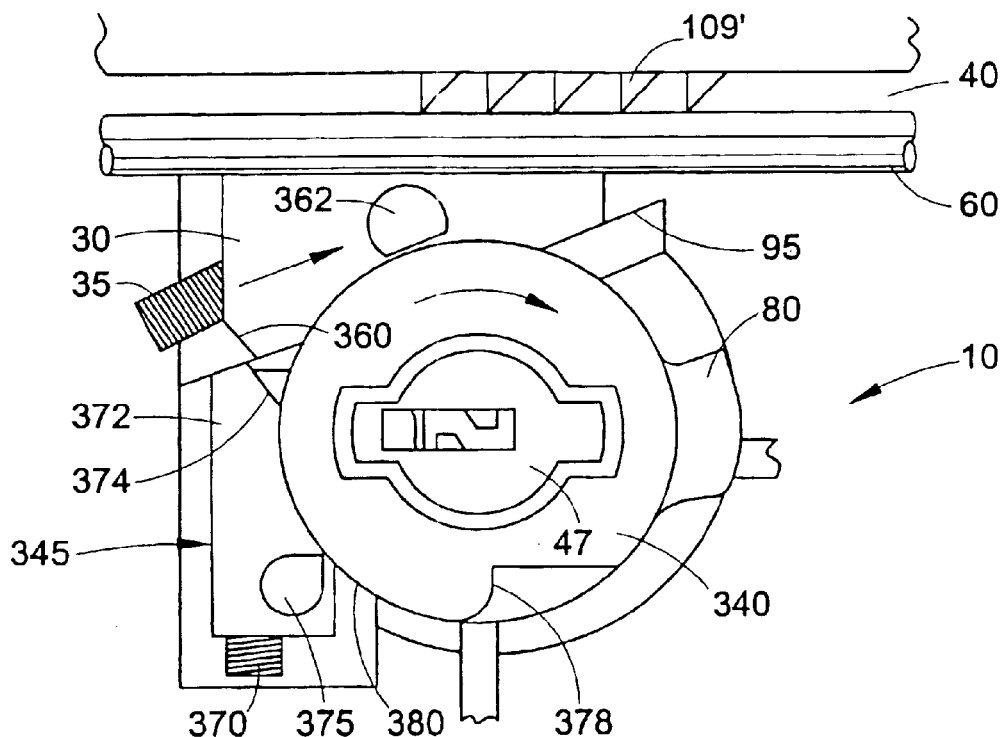
FIG. 20 is the cable locking mechanism of FIG. 16 shown in the cinch position.

In order to engage the locking mechanism 10, the lock cylinder 47 and thus the winch 340 are rotated clockwise 90 degrees by a key fitted for the lock cylinder 47 to the cinch position, as shown in FIG. 20. In the cinch position, the first knob 362 of locking clamp 30 is released from mating contact with the first protrusion 80 and the spring 35 is allowed to force the locking clamp 30 to move axially along the sloped surface 95. The locking clamp 30 continues to move along the sloping surface 95 until the locking clamp 30 is wedged securely between the cable 60 and the sloping surface 95'. Once the locking clamp 30 is wedged, the cable 60 can not be pushed back toward the lower housing unit 302, and any attempt to make the cable 60 move in such direction would result in further wedging the locking clamp 30 against the cable 60 and sloping surface 95' due to the angled toothed protrusions 109 and 109'. However, by only turning the lock cylinder 47 90 degrees clockwise, the periphery portion 380 of the winch 340 remains in contact with the second knob 375 located on the latch 345 and therefore the sloped surface 374 of the latch 345 is prevented from contacting the cutout 360 of the locking clamp 30. Thus, without the latch 345 securing the locking clamp 30 in position, the locking clamp 30 can move against the force exerted by spring 35 provided sufficient force is exerted on the cable 60.

Figure 21:
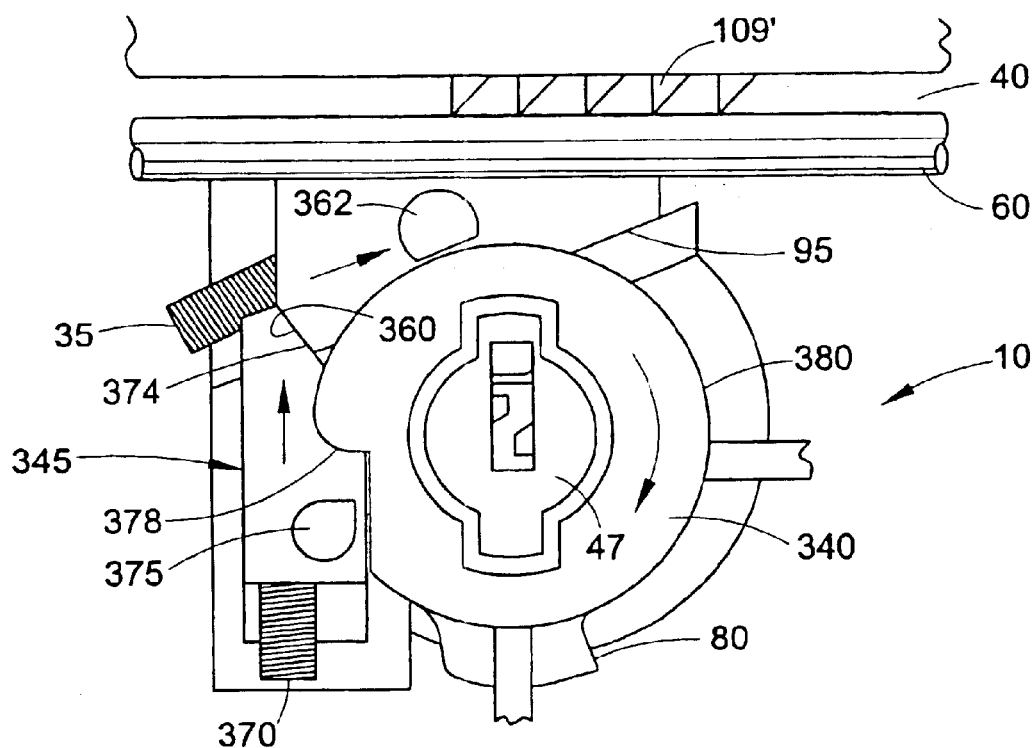
FIG. 21 is the cable locking mechanism of FIG. 16 shown in the locked position.

Once the cable 60 and upper housing unit 304 are sufficiently tightened as to secure the gun lock assembly onto the gun, the lock cylinder 47 and winch 340 can be rotated an additional 90 degrees in the clockwise direction to the locked position, as shown in FIG. 21. Such further rotation releases the second knob 375 from mating contact with the periphery 380 of the winch 340 thereby allowing the second spring 370 to move the sloped surface 374 of the latch 345 into abutting contact with cutout 360 of the locking clamp 30. Once the latch 345 is in abutting contact with the locking clamp 30, the locking clamp 30 is prevented from being displaced back against the force of spring 35.

Figure 22:
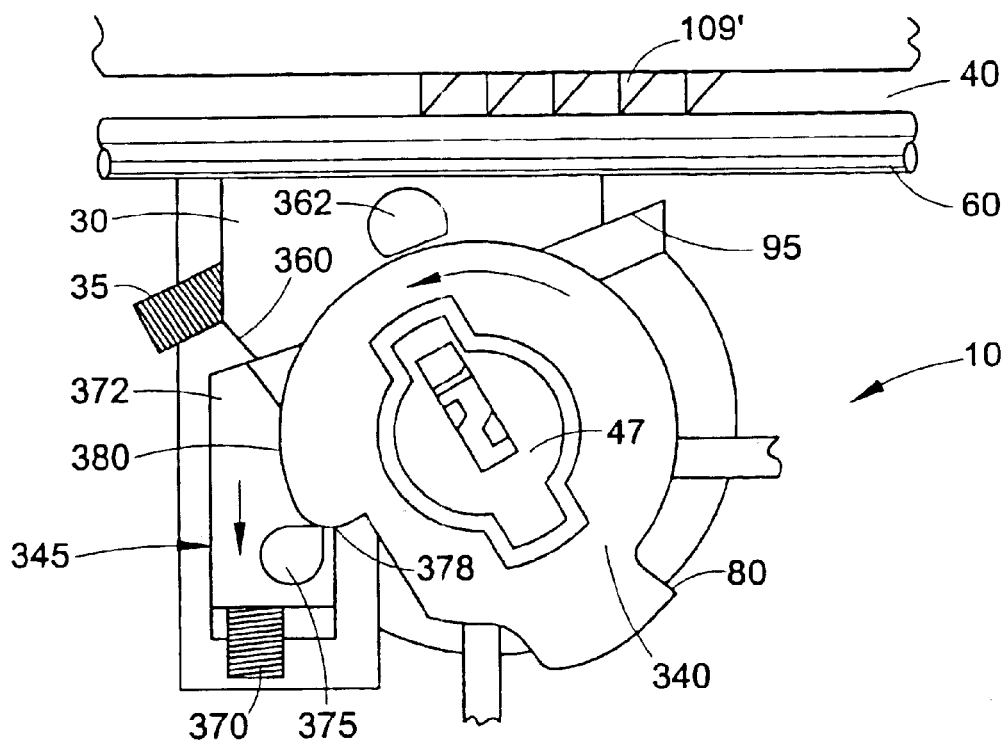
FIG. 22 is the cable locking mechanism of FIG. 16 shown moving from the locked position to the cinch position.
Figure 23:
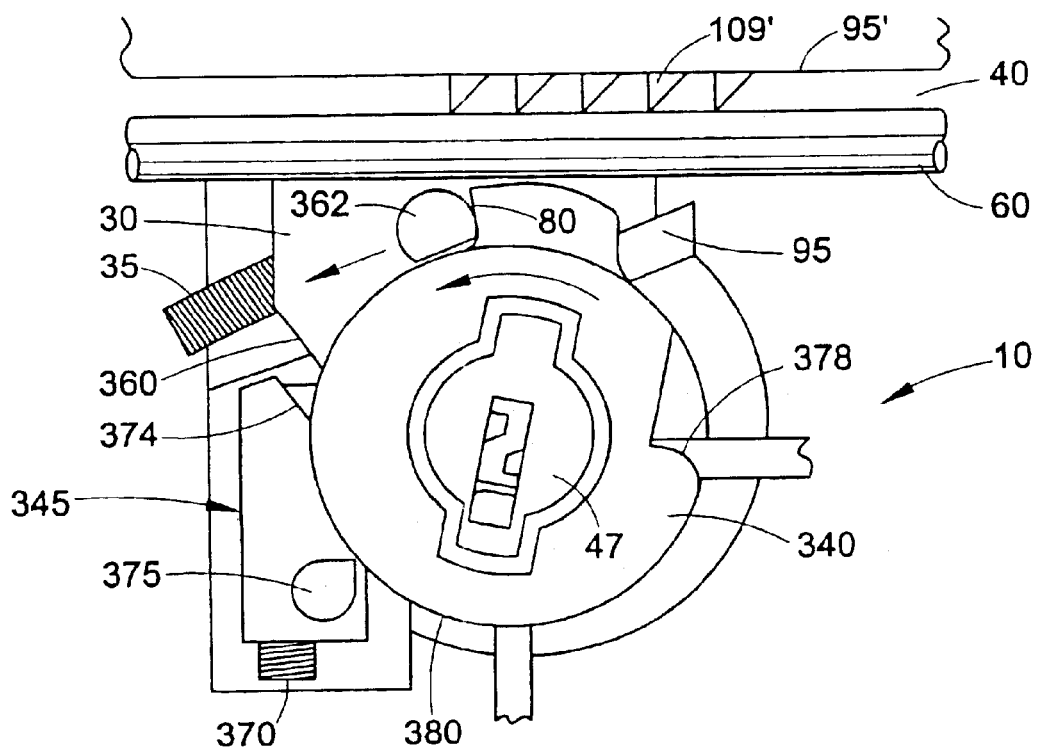
FIG. 23 is the cable locking mechanism of FIG. 16 shown moving from the cinch position to the unlocked position.

As shown in FIGS. 22 and 23, in order to unlock the lock assembly 10, the lock cylinder 47 and winch 340 must be rotated counterclockwise. Upon such rotation, protrusion 378 engages knob 375 and forces the latch 345 down against the force of spring 370 and continued rotation allows the periphery portion 380 to re-engage knob 375. Further rotation of the lock cylinder 47 and winch 340 in the counterclockwise direction re-engages the first protrusion 80 with the first knob 362 against the biasing force of spring 35 displacing the locking clamp 30 away from the cable 60 and back into the unlocked position.

Figure 14:
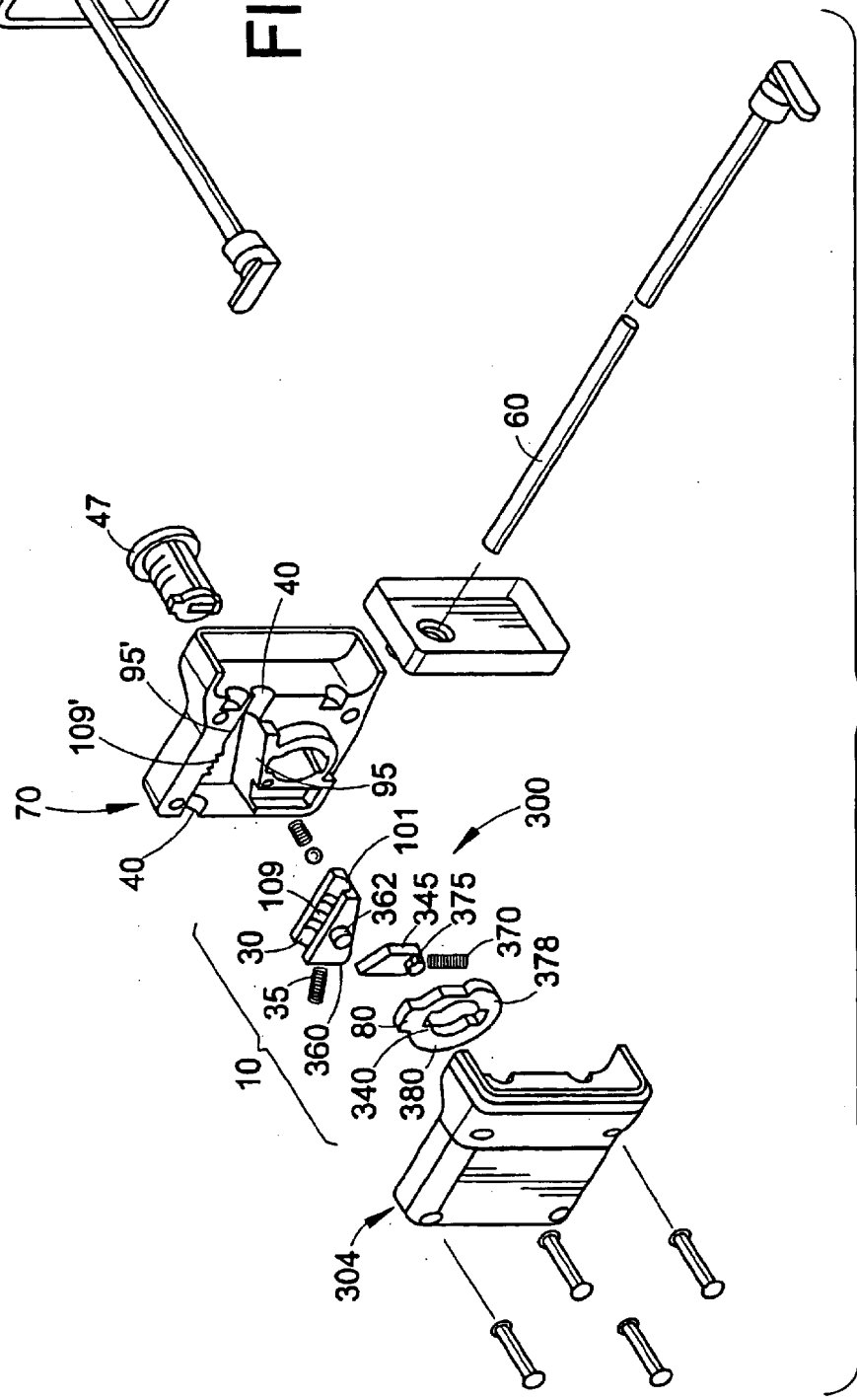
FIG. 14 is an exploded view of a cable gun lock incorporating the locking mechanism of the present invention which includes only an upper lock housing.

As shown in FIGS. 14 and 15, the cable in this embodiment may be less flexible that those used in other embodiments. A more rigid cable 60 may be preferred in this type of embodiment since it would make it easier to pass the cable through portions of the gun.

Cable Lockout Hasp

Figure 25:
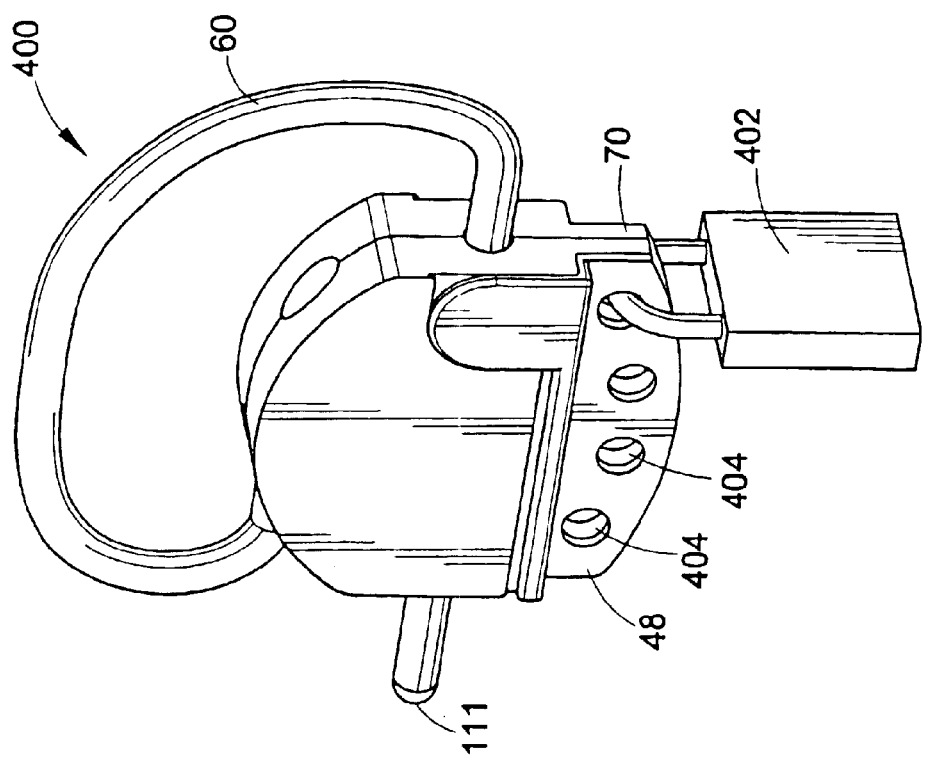
FIG. 25 illustrates the cable lockout hasp of FIG. 24 shown in the locked position.
Figure 24:
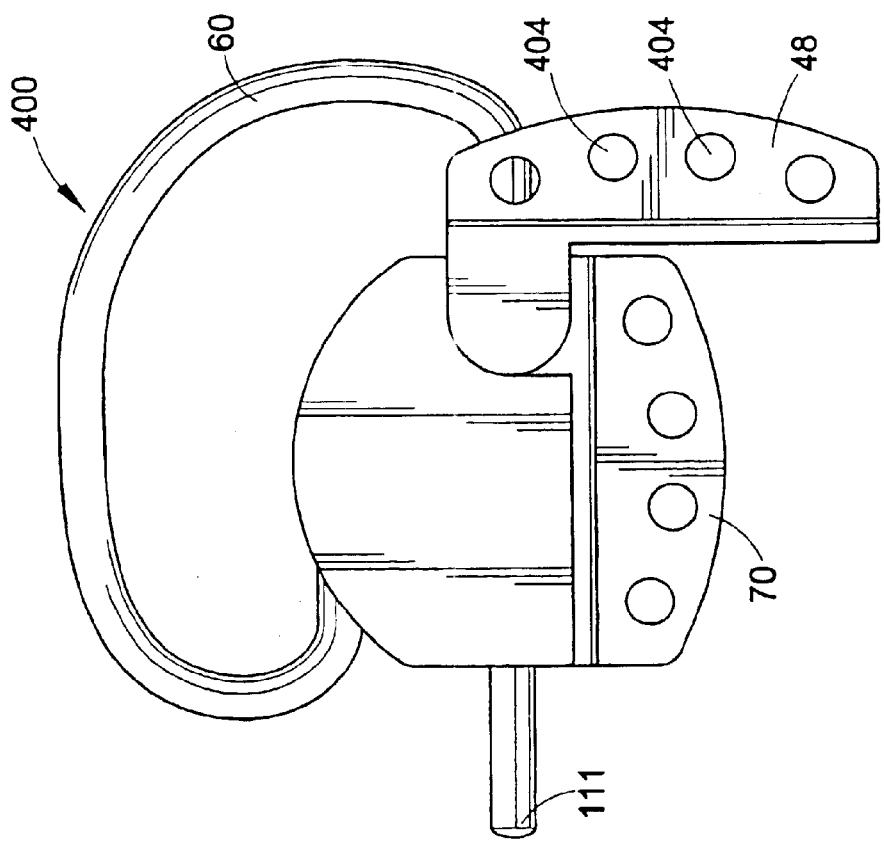
FIG. 24 illustrates an alternate embodiment of a cable lockout hasp incorporating the locking mechanism of the present invention, shown in the unlocked position.
Figure 26:
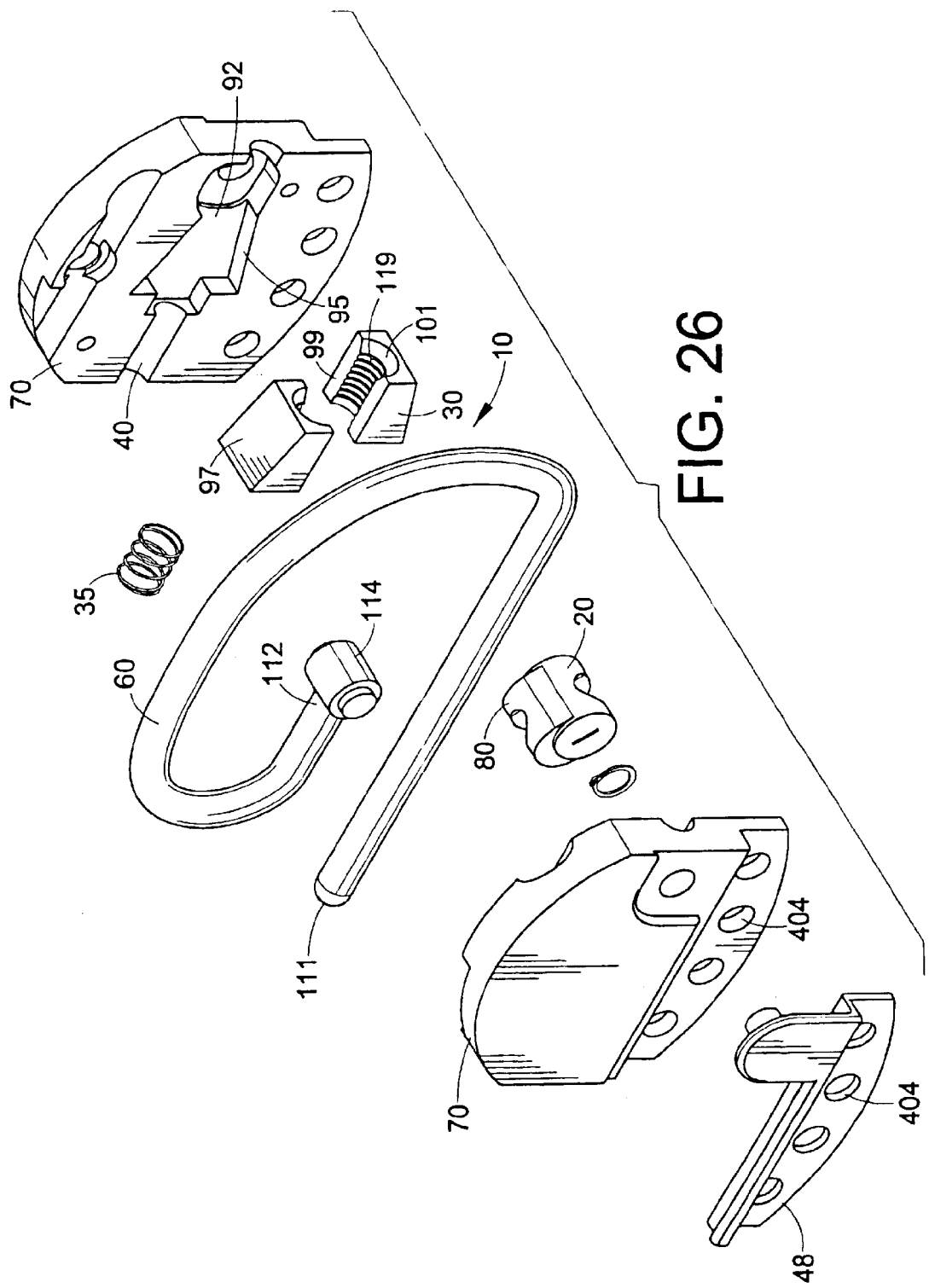
FIG. 26 is an exploded view of the cable lockout hasp of FIG. 24.
Figure 27A:
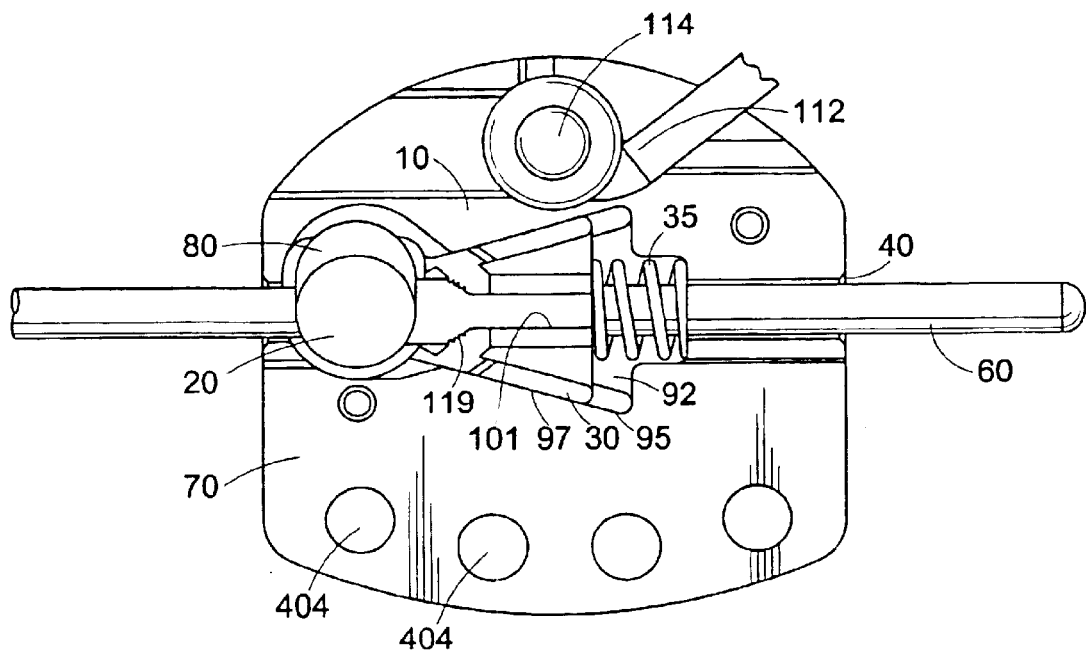
FIG. 27A is a partial, cross-sectional view of the cable lockout hasp of FIG. 24 shown in the locked position.
Figure 27B:
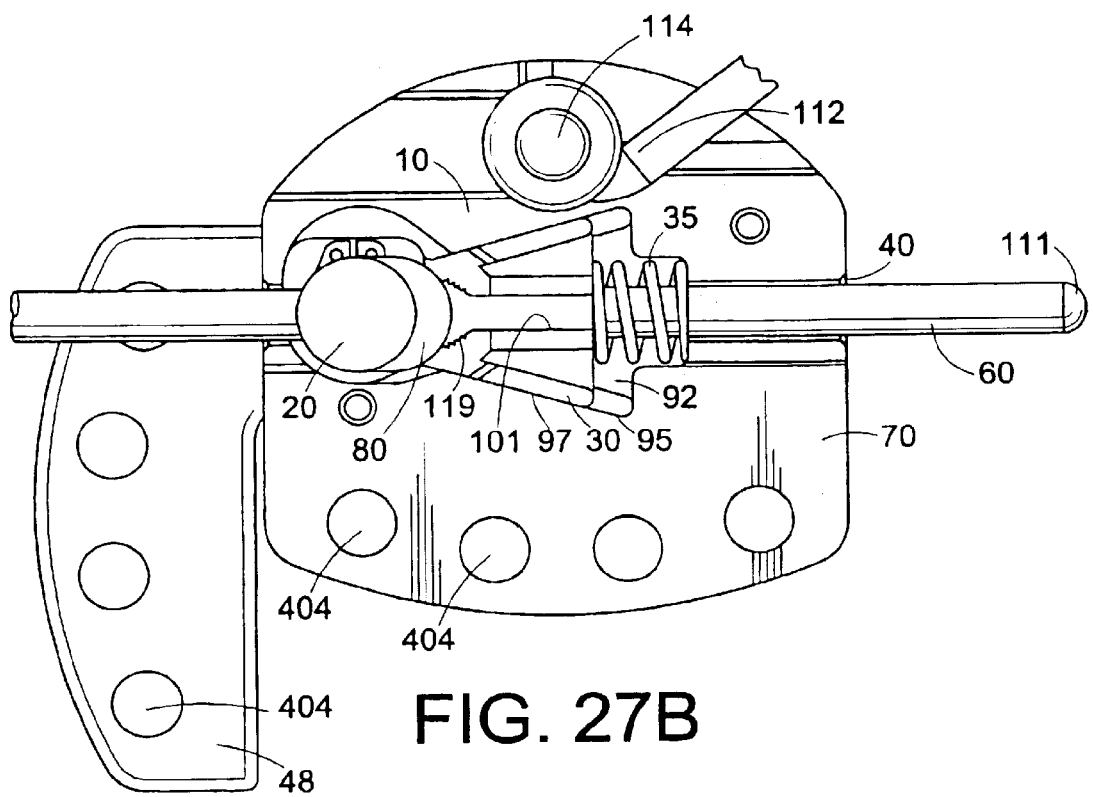
FIG. 27B is a partial, cross-sectional view of the cable lockout hasp of FIG. 24 shown in the unlocked position.

As shown in FIGS. 24 and 25, the cable lockout hasp 400 includes a lock body 70, a cable 60, a lever arm 20, a spring-biased set of locking clamps 30, a locking clamp opening 92 which houses the locking clamp 30, a hasp 48, and a cable passageway 40. In general, these parts are similar to those described above. The hasp 48 is a lever which pivots approximately 90 degrees and engages the lever arm 20 such that the lever arm 20 rotates approximately 90 when the hasp 48 pivots.

In the locked position, as shown in FIG. 25, the hasp 48 is rotated to be substantially parallel to the cable passageway 40. So position, the lever arm 20 does not engage the locking clamps 30 and therefore the locking clamps 30 are spring biased by locking clamp spring 35 and thus positioned in the locking clamp opening 92 towards the lever arm 20. The cable 60, which has a fixed end 112 connected to swivel 114 and a formed end 111, can be inserted through the cable passageway 40. The formed end 111 of the cable is inserted through the passageway 40 and into the locking clamp opening 92 between the two locking clamps 30. As described above, the locking clamps 30 include a groove 101 along the top surface 99 of the locking clamp 30, which includes a set of teeth therein 109, that matches the curvature of the cable 60. The locking clamps 30 also have a sloped bottom surface 97 which mates with the slope in the sloped surfaces 95 of the locking clamp opening 92. As the formed end 111 is inserted between the locking clamps 30, the locking clamps slide along the sloped surfaces 95 against the spring force to allow the cable 60 to pass therebetween. However, if the cable is pulled in the other direction, i.e. to withdraw the cable 60 from the lock body 70, the locking clamps 30 move toward the lever arm 20 thereby further securing the grip the cable 60. As shown in FIG. 25, a conventional padlock 402 can be inserted through one of the hasp padlock holes 404 to ensure that the hasp 48 cannot be rotated from the locked position.

In order to disengage the locking mechanism 10, the padlock 402 is removed from the hasp padlock hole 404 and the hasp 48 is pivoted approximately 90 degrees so that it is approximately perpendicular to the cable passageway 40. The pivoting of the hasp 48 rotates the lever arm 20 approximated 90 degrees so that the protrusion 80 on the lever arm 20 engages the locking clamps 30. When the protrusion 80 of the lever arm 20 engages the locking clamps 30, the locking clamps 30 are displaced against the spring force and slide along the sloped surfaces 95 of the locking clamp opening 92. The cable passageway 40 widens and the locking clamps 30 disengage from the cable 60. The cable 60 is able to move in either direction, i.e. either further into the lock body 70 or away from the lock body 70.

Adjustable Cable Lock

The adjustable cable lock 500 includes a lock body 70, cable 60, lock cylinder 47, cylinder extension 240, spring-biased locking clamps 30, a cable passageway 40 and a locking clamp opening 92. Again, like the previous embodiments, the operation of these pieces is substantially similar. As with the first embodiment of the cable gun lock, the cylinder extension 240 operates as the lever arm 20 in this embodiment. The cable 60 is substantially similar to the previously described cables, with a fixed end 112 connected to a swivel 114 and a formed end 111 for insertion through the cable passageway 40.

In the locked position, as shown in FIG. 31, the cylinder extension 240 does not engage the locking clamps 30 and thus the locking clamps 30, which are biased by spring 35, are positioned closest to cylinder extension 240 thereby providing a narrow cable passageway 40. As the formed end 111 of the cable 60 is inserted into the cable passageway 40 and into the locking clamp opening 92 between the two locking clamps 30, the locking clamps 30 slide along sloped surfaces 95 to allow the cable 60 to pass further into the lock body. However, as in other embodiments, when the cable 60 is pulled in the opposite direction in an attempt to withdraw the cable 60 from the lock body 70, the locking clamps 30 move with the spring force up the sloped surfaces 95 towards the cylinder extension 240, thereby further securing the cable 60 between the locking clamps 30.

In order to remove the cable 60 from the lock body 70, the lock cylinder 47 is rotated with a key, thereby rotating the cylinder extension 240 so that protrusion 80 engages the locking clamps 30 thereby displacing the locking clamps 30 along the sloped surfaces 95, as shown in FIG. 32. The displacement of the locking clamps 30 provides a wider cable passageway 40 as the locking clamps 30 disengage from the cable 60. The cable is thus free to move in either direction, into the lock body or away from the lock body.

What is claimed is:

1. A cable locking mechanism comprising:

one or more locking clamps that slideably move along one or more sloped surfaces to engage a cable, wherein said locking clamps are housed within an opening in a lock body and said one or more sloped surfaces make up at least one side of said opening;

a lever arm that is moveable to engage the locking clamps, wherein said lever arm includes at least one protrusion which displaces said locking clamps when in engagement therewith;

a spring that engages said locking clamps and biases said locking clamps towards said lever arm;

a cable passageway for receiving a cable, wherein said cable passageway passes through said opening housing said locking clamps; and an actuation means engaged with said lever arm, wherein the movement of the actuation means causes the movement of the lever arm.

2. The cable locking mechanism of claim 1, wherein said locking clamps are sloped along one surface and, wherein said locking clamp sloped surface is complementary to the sloped surface of said opening.

3. The cable locking mechanism of claim 1, wherein said locking clamps further comprise a groove for receiving a cable.

4. The cable locking mechanism of claim 3, wherein said groove is hemispherical.

5. The cable locking mechanism of claim 1, wherein said locking clamps further comprise one or more chamfered surfaces.

6. The cable locking mechanism of claim 1 further comprising one or more sets of teeth, wherein said teeth are located either on the locking clamps or on a surface of the locking clamp opening and are located on either side of a cable inserted into said opening.

7. The cable locking mechanism of claim 1, wherein said actuation means is a lock cylinder.

8. The cable locking mechanism of claim 1, wherein said actuation means is a hasp.

9. The cable locking mechanism of claim 7, wherein said hasp includes one or more holes for receiving a padlock.

10. A cable lock for preventing loading and discharge of a firearm having a barrel with a muzzle end and a chamber end, the lock comprising:

a) a cable assembly having a first and second end wherein the first end has a tab, and b) a lock body assembly comprising a rim for mating with the firearm, a cable opening for insertion of the cable assembly, and a cable locking mechanism, wherein the cable is placed into the barrel of the firearm with the tab of the first end lodged in or near the chamber of the firearm and the second end of the cable protruding from the muzzle end of the barrel of the firearm, and wherein the second end of the cable is inserted into the cable opening of the lock body assembly, the lock body assembly slideably moved toward the first cable end until said lock body mates with the firearm muzzle, the rim forms a seal with the firearm barrel, and the lock body assembly is secured by the cable locking mechanisms;

wherein said cable locking mechanism comprises:
one or more locking clamps that slideably move along one or more sloped surfaces to engage a cable, wherein said locking clamps are housed within an opening in a lock body and said one or more sloped surfaces make up at least one side of said opening;
a lever arm that is moveable to engage the locking clamps, wherein said lever arm includes at least one protrusion which displaces said locking clamps when in engagement therewith;
a spring that engages said locking clamps and biases said locking clamps towards said lever arm;
a cable passageway for receiving a cable, wherein said cable passageway passes through said opening housing said locking clamps; and
actuation means engaged with said lever arm, wherein the movement of the actuation means causes the movement of the lever arm.

11. The cable lock of claim 10 wherein the cable is an impregnated cable or a plastic coated cable.

12. The cable lock of claim 10 wherein the cable assembly comprises one or more spacers to adjust the gun lock for firearms of different calibers or barrel lengths.

13. The cable lock of claim 10 wherein the lock body assembly comprises one or more anti-saw plates, one or more anti-saw pins, or one or more anti-saw plates and one or more anti-saw pins.

14. The lock of claim 10 wherein when the cable locking mechanism is locked, the locking clamps apply a locking force to the cable such that the cable can slideably move in one direction through the cable locking mechanism, and wherein when the cable locking mechanism is unlocked, the locking clamps do not apply a locking force to the cable and the cable can slideably move in two directions through the cable locking mechanism.

15. A cable lock comprising:
a lock body;
a cable;
one or more locking clamps that slidably move along one or more sloped surfaces to engage a cable, wherein said locking clamps are housed within an opening in a lock body and said one or more sloped surfaces make up at least one side of said opening;
a lever arm that is moveable to engage the locking clamps, wherein said lever arm includes at least one protrusion which displaces said locking clamps when in engagement therewith;
a spring that engages said locking clamps and biases said locking clamps into engagement with a periphery of said lever arm;
a cable passageway for receiving a cable, wherein said cable passageway passes through said opening housing said locking clamps; and
an actuation means engaged with said lever arm, wherein the movement of the actuation means causes the movement of the lever arm.

16. The cable lock of claim 15 wherein one end of the cable is affixed to the lock body by a swivel joint.

17. The cable lock of claim 15, wherein said actuation means is a hasp, wherein said hasp includes one or more holes for receiving a lock.

18. The cable lock of claim 15, wherein said locking clamps include
a sloped surface that is complementary to a sloped surface in the opening housing said locking clamps;
a groove located on a surface of said locking clamps for receiving said cable; and
a set of teeth disposed within the groove for grasping and holding said cable.

* * * * *